United States Patent
Mitsuyoshi et al.

(10) Patent No.: US 7,811,171 B2
(45) Date of Patent: Oct. 12, 2010

(54) GAME SYSTEM AND GAME PROGRAM

(75) Inventors: Masaru Mitsuyoshi, Kyoto (JP); Kouzou Tahara, Kyoto (JP); Eiji Ikeda, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 1239 days.

(21) Appl. No.: 10/924,891

(22) Filed: Aug. 25, 2004

(65) Prior Publication Data
US 2005/0197187 A1 Sep. 8, 2005

(30) Foreign Application Priority Data
Mar. 2, 2004 (JP) .............................. 2004-058035

(51) Int. Cl.
*A63F 13/00* (2006.01)
(52) U.S. Cl. .............................. 463/39; 463/23; 463/30; 463/31; 463/37; 463/40; 463/42
(58) Field of Classification Search .................. 463/30, 463/31, 39, 43, 45, 41, 42, 44, 16, 23
See application file for complete search history.

(56) References Cited

U.S. PATENT DOCUMENTS

| | | | |
|---|---|---|---|
| 5,046,736 A * | 9/1991 | Bridgeman et al. | 463/13 |
| 6,009,458 A * | 12/1999 | Hawkins et al. | 709/203 |
| 6,554,712 B1 | 4/2003 | Takahashi | 463/43 |
| 6,684,062 B1 * | 1/2004 | Gosior et al. | 455/73 |
| 6,733,392 B2 * | 5/2004 | Narita | 463/43 |
| 2004/0082383 A1 * | 4/2004 | Muncaster et al. | 463/39 |

FOREIGN PATENT DOCUMENTS

| | | |
|---|---|---|
| JP | 11-179054 | 7/1999 |
| JP | 2001-062148 | 3/2001 |
| JP | 2001-314655 | 11/2001 |
| JP | 2002-044730 | 2/2002 |
| JP | 2002-126353 | 5/2002 |
| JP | 2003-134127 | 5/2003 |

OTHER PUBLICATIONS

Japanese Official Action issued for Japanese Patent Application No. JP2004-058035, dated Jul. 7, 2008.

* cited by examiner

*Primary Examiner*—Peter DungBa Vo
*Assistant Examiner*—Sunit Pandya
(74) *Attorney, Agent, or Firm*—Nixon & Vanderhye P.C.

(57) ABSTRACT

A game image representing a part or all of an identical game space is displayed on game machines. A first game machine detects the link strength of wireless communication between the first game machine and a second game machine. The first game machine executes predetermined game processing such that a processing result changes depending on the detected link strength. Further, the first game machine updates the game image based on a result of the predetermined game processing. The first game machine sends game processing information indicating the result of the predetermined game processing, to the second game machine. The second game machine updates the game image based on the game processing information sent from the first game machine.

25 Claims, 17 Drawing Sheets

| ATTRIBUTE PARAMETER | FIRE SPELL VALUE | WATER SPELL VALUE | THUNDER SPELL VALUE |
|---|---|---|---|
| FIRST ATTRIBUTE PARAMETER | -20 | 120 | 20 |
| SECOND ATTRIBUTE PARAMETER | 20 | -80 | 70 |
| THIRD ATTRIBUTE PARAMETER | 100 | -60 | -60 |

GAME SYSTEM AND GAME PROGRAM

BACKGROUND AND SUMMARY OF THE INVENTION

1. Field of the Invention

The illustrative embodiments relate to a game system and a game program, and more particularly to a game system and a game program which allow a plurality of players to play a game using wireless communication functionality.

2. Description of the Background Art

Game systems are known in which a plurality of game machines communicate with each other using wireless functionality. For example, there exist game systems in which, by using wireless functionality, a plurality of players are allowed to exchange monsters with one another, or players can battle with one another (for example, see the instructions for "Pocket Monsters Midori Leaf Green", published by The Pokemon Company, Jan. 29, 2004, pp. 46-55).

In addition, there exists a game system in which a wireless controller and the main unit of a game machine establish wireless communication therebetween and the signal strength of the wireless communication is reflected to the content of the display screen of the game (for example, see Japanese Laid-Open Patent Publication No. 2002-126353). In this game system, the main unit of the game machine changes the content to be displayed on the display depending on the strength of a received signal. For example, when a player holding a controller moves away from the main unit of the game machine, the character displayed on the display screen accordingly moves forward. In this manner, by allowing the display content on the screen to change according to the player's actual movement, a game can be made to approximate the actual actions.

In the above-described conventional game systems in which game machines communicate with each other, the signal strength of wireless communication has absolutely nothing to do with the way the game proceeds. Therefore, during the game, the players do not need to pay attention to the positional relationship therebetween, wireless conditions, or the like.

In addition, in the above-described conventional game system in which a wireless controller and the main unit of a game machine establish wireless communication therebetween, the display content is changed depending on the signal strength between the wireless controller and the main unit of the game machine. That is, in this game system, only the display content changes based on the distance between the player and the display screen. Therefore, with this game system, it is difficult to maintain the player's interest, because a change in the distance between the player and the display screen does not change the way the game itself proceeds.

Therefore, a feature of the illustrative embodiments is to provide a very amusing game that the player can play in an unconventional way in a game system which establishes wireless communication.

The illustrative embodiments have the following aspects to attain the feature mentioned above. It is to be understood that reference numerals, supplemental remarks, etc., in parentheses are provided for illustrating the corresponding relationship with an embodiment which will be described later to assist in the understanding of the present invention and thus are not intended to limit the scope of the present invention.

A first aspect of the illustrative embodiments is directed to a game system comprising a first portable game machine (1a) and at least one second portable game machine (1b, 1c) capable of establishing short-range wireless communication with the first game machine. A game image representing a part or all of an identical game space is displayed on each game machine. The first game machine comprises: link strength detection means (CPU core 11 which performs S13 ("S" stands for step; the same applies to the following; hereinafter only step numbers will be provided); game processing execution means (S18 and S19); first game image updating means (S44); and processing result sending means (S41). The link strength detection means detects the link strength of wireless communication between the first game machine and the second game machine. The game processing execution means executes predetermined game processing (spell attack processing) such that the processing result changes depending on the link strength detected by the link strength detection means. The first game image updating means updates the game image based on the result of the predetermined game processing. The processing result sending means sends game processing information (master communication data) to the second game machine, the game processing information indicating the result of the predetermined game processing. In addition, the second game machine comprises: second game image updating means for updating the game image based on the game processing information sent from the first game machine.

According to a second aspect of the illustrative embodiments, in the above-described game system, there may be a plurality of second game machines. In this configuration, the predetermined game processing may use at least a plurality of attribute parameters (first to third attribute parameters) which are associated with the second game machines, respectively. The game processing execution means may execute the predetermined game processing by changing a value of each attribute parameter depending on link strengths between the first game machine and the second game machines associated with the attribute parameters.

According to a third aspect of the illustrative embodiments, game characters may appear in the game space, the game characters including a plurality of player characters (first to third player characters 51 to 53) to be operated by players of the game machines, respectively. In this configuration, the predetermined game processing may be processing for changing a value of an energy level parameter which indicates an energy level of each game character. The game processing execution means may change a degree of change in the value of the energy level parameter depending on the link strength.

According to a fourth aspect of the illustrative embodiments, an enemy character (enemy characters 54a to 54d) which is different from the player characters may further appear in the game space. In this configuration, the predetermined game processing may be processing for changing an energy level parameter of the enemy character in response to an attack by the player characters.

According to a fifth aspect of the illustrative embodiments, the link strength detection means may express the link strength in a numeric value. In this configuration, the first game machine may further comprise influence-level information setting means (S10 and S11) for setting influence-level information (influence-level data) in response to an instruction from a player of the first game machine, the influence-level information indicating an influence level of the link strength to be exerted on the predetermined game processing. The game processing execution means may change the influence level of the link strength to be exerted on the predetermined game processing depending on the influence-level information.

According to a sixth aspect of the illustrative embodiments, the first game machine may further comprise: determination means (S14); and notification means (S15). The determination means determines whether or not a value of the link strength detected by the link strength detection means is equal to or smaller than a predetermined value. The notification means notifies a player that a game has been suspended, if the execution of the predetermined game processing has been suspended. If the determination means determines that the value of the link strength is equal to or smaller than the predetermined value, the game processing execution means may stop the execution of the predetermined game processing.

A seventh aspect of the illustrative embodiments is directed to a game system comprising at least two portable game machines capable of establishing short-range wireless communication therebetween. In the game system, the game machines each comprise: link strength detection means (S13); game processing execution means (S18 and S19); and game image updating means (S44). The link strength detection means detects a link strength of wireless communication with respect to the other game machine. The game processing execution means executes predetermined game processing such that a processing result changes depending on the link strength detected by the link strength detection means. The game image updating means updates a game image based on a result of the predetermined game processing.

According to an eighth aspect of the illustrative embodiments, the game machines each may be set with a parameter. In this configuration, the game processing execution means may perform a predetermined calculation using the link strength detected by the link strength detection means and the parameter set to the other game machine with respect to which the link strength has been detected, and execute the predetermined game processing such that a processing result changes depending on a result of the calculation.

According to a ninth aspect of the illustrative embodiments, the game machines each may further comprise: parameter setting means for setting the parameter; and parameter sending control means for sending the parameter to the other game machine. The game processing execution means may perform a predetermined calculation using the link strength detected by the link strength detection means and the parameter to be sent from the other game machine with respect to which the link strength has been detected.

According to a tenth aspect of the illustrative embodiments, in the above-described game system, the parameters may be associated with the game machines, respectively.

According to an eleventh aspect of the illustrative embodiments, a non-player character (an enemy character) which is different from player characters to be operated by players of the game machines may appear in a game to be executed by the game processing execution means. In this configuration, the game processing execution means may perform a predetermined calculation using the link strength detected by the link strength detection means and the parameter set to the other game machine with respect to which the link strength has been detected, and change a result of an attack against the non-player character based on a result of the calculation.

A twelfth aspect of the illustrative embodiments is directed to a game system comprising a first portable game machine and a second portable game machine capable of establishing short-range wireless communication with the first game machine. In this configuration, a game image representing a part or all of an identical game space in which a non-player character appears is displayed on each game machine, the non-player character being a game character which is different from player characters to be operated by players of the game machines. The second game machine comprises: parameter storage means (WRAM 14) for storing a parameter; and parameter sending control means (S55) for sending the parameter to the first game machine. The first game machine comprises: parameter receiving control means; link strength detection means (S13); and attack processing means (S18, S19). The parameter receiving control means receives the parameter sent from the parameter sending control means of the second game machine. The link strength detection means detects a link strength of wireless communication between the first game machine and the second game machine. The attack processing means performs a predetermined calculation using the link strength with respect to the second game machine detected by the link strength detection means and the parameter of the second game machine received by the parameter receiving control means, and changes a result of an attack against the non-player character based on a result of the calculation.

A thirteenth aspect of the illustrative embodiments is directed to a game system comprising a first portable game machine and a plurality of second portable game machines capable of establishing short-range wireless communication with the first game machine. In the game system, a game image representing a part or all of an identical game space in which an on-player character appears is displayed on each game machine, the non-player character being a game character which is different from player characters to be operated by players of the game machines. The second game machines each comprise: parameter storage means for storing a parameter; and parameter sending control means for sending the parameter to the first game machine. The first game machine comprises: parameter receiving control means; link strength detection means; and attack processing means. The parameter receiving control means receives the parameter to be sent from the parameter sending control means of each second game machine. The link strength detection means detects link strengths of wireless communication between the first game machine and each second game machine. The attack processing means performs a first predetermined calculation using the link strengths with respect to the second game machines detected by the link strength detection means and the parameters of the second game machines received by the parameter receiving control means, performs a second predetermined calculation using a result of the first calculation, and changes a result of an attack against the non-player character based on a result of the second calculation.

The present invention may be provided as a first game machine which is included in the above-described game system. In addition, the present invention may be provided as a game program which provides the first game machine with the above-described functions by allowing the first game machine to execute the game program.

According to the first aspect, the game proceeds by operations of a plurality of players using a plurality of portable game machines. The way the game proceeds changes depending on a link strength which changes according to the distance between the players or the like. Thus, according to the first aspect, a new way of playing the game is provided in which by changing the distance between the players the way the game proceeds changes. In addition, since the result of game processing performed by the first game machine is reflected to the second game machine, by making the way the game proceeds consistent in all game machines, the sense of unity that the players are playing the game together is given to the players.

According to the second aspect, a plurality of second game machines are included in the game system. In the case where the predetermined game processing uses a plurality of attribute parameters, the following effects can be obtained. Specifically, when three or more players play a game together, the players can obtain a new type of game experience where the way the game proceeds changes depending on the positional relationship between the players. Further, by assigning an attribute parameter to each game machine, the players having the game machines can be provided with different characteristics. By this, for example, the way the game proceeds can be made different between the case where player B comes close to player A and the case where player C comes close to player A. Accordingly, by assigning different characteristics to the players, the flexibility of the way the game proceeds can be increased, which in turn makes the game more complex and interesting.

According to the third aspect, in the case where the predetermined game processing is processing for changing the value of an energy level parameter of a game character, the level or type of attack or defense against the game character can be changed depending on the link strength. That is, the player can be provided with a new type of game experience that the attack power or defense power of the game character changes depending on the positional relationship between the players.

Moreover, according to the fourth aspect, in the case where the predetermined game processing is processing for changing the energy level parameter of an enemy character in response to an attack by the player character, a game can be provided which provides the players with a sense of unity that the players cooperated to defeat the enemy character.

According to the fifth aspect, in the case where the influence level of the link strength changes depending on influence-level information, a game system which supports spaces of various sizes can be realized. That is, even when the players are playing the game in a small space, the players can get the feeling as if they were playing in a large space.

According to the sixth aspect, in the case where the first game machine further includes determination means and notification means, the players are notified of a suspension of the game before communication has completely broken down and resumption of the game becomes difficult. Thus, communication between the game machines can be easily maintained.

According to the seventh aspect, the game proceeds by operations of a plurality of players using a plurality of portable game machines. The way the game proceeds changes depending on the link strength which changes according to the distance between the players or the like. Thus, according to the seventh aspect, a new way of playing the game is provided in which by changing the distance between the players, the way the game proceeds changes.

According to the eighth aspect, the way the game proceeds changes depending on the parameters set to the game machines and the link strength between the game machines. By this, it becomes possible to arrange a different player near a given player in accordance with situations, and thus the players can play the game in a new way where the parameters (the locations of other players) change depending on the situations.

According to the ninth aspect, the parameters are set by a game machine which sends the parameters. Thus, since game machines on the receiving side do not need to set the parameters, setting of parameters can be performed easily.

According to the tenth aspect, since the parameters are associated with the game machines, respectively, the game machines can be provided with characteristics. Accordingly, in the case where the system includes three or more game machines, the way the game proceeds, which changes depending on the locations of the players, or the like, can be made more complex, resulting in a very amusing game.

According to the eleventh aspect, a new way of playing the game is provided in which the result of an attack changes depending on the locations of the players.

According to the twelfth and thirteenth aspects of the illustrative embodiments, the result of an attack against a non-player character changes by operations of a plurality of players using a plurality of portable game machines. In addition, the result of the attack changes depending on the link strength which changes according to the distance between the players or the like. Thus, according to these aspects, a new way of playing the game is provided, in which by changing the distance between the players, the result of an attack changes.

According to the thirteenth aspect, the game is played by three or more players. Thus, a plurality of sets, each including a parameter which changes the result of an attack and the link strength with respect to a game machine which sends the parameter, are arranged. This makes the result of an attack complex, resulting in the providing of a very amusing game.

These and other objects, features, aspects and advantages of the present invention will become more apparent from the following detailed description of the present invention when taken in conjunction with the accompanying drawings.

DESCRIPTION OF THE PREFERRED EMBODIMENTS

The configuration of a game machine included in a game system according to an embodiment of the present invention will be described below with reference to the drawings. The game system includes a plurality of portable game machines (hereinafter simply referred to as "game machines"). In the present embodiment, for example, the game system includes three game machines and three players using the game machines, respectively. The players play a game by establishing wireless communication between the three game machines. In the following description, the three players are referred to as "first to third players", respectively; the game machine used by the first player is referred to as a "first game machine"; the game machine used by the second player is referred to as a "second game machine"; and the game machine used by the third player is referred to as a "third game machine". Note that the first to third players may be simply referred to as "players" and the first to third game machines may be simply referred to as "game machines" in the case where it is not necessary to distinguish between them.

Figure 1:
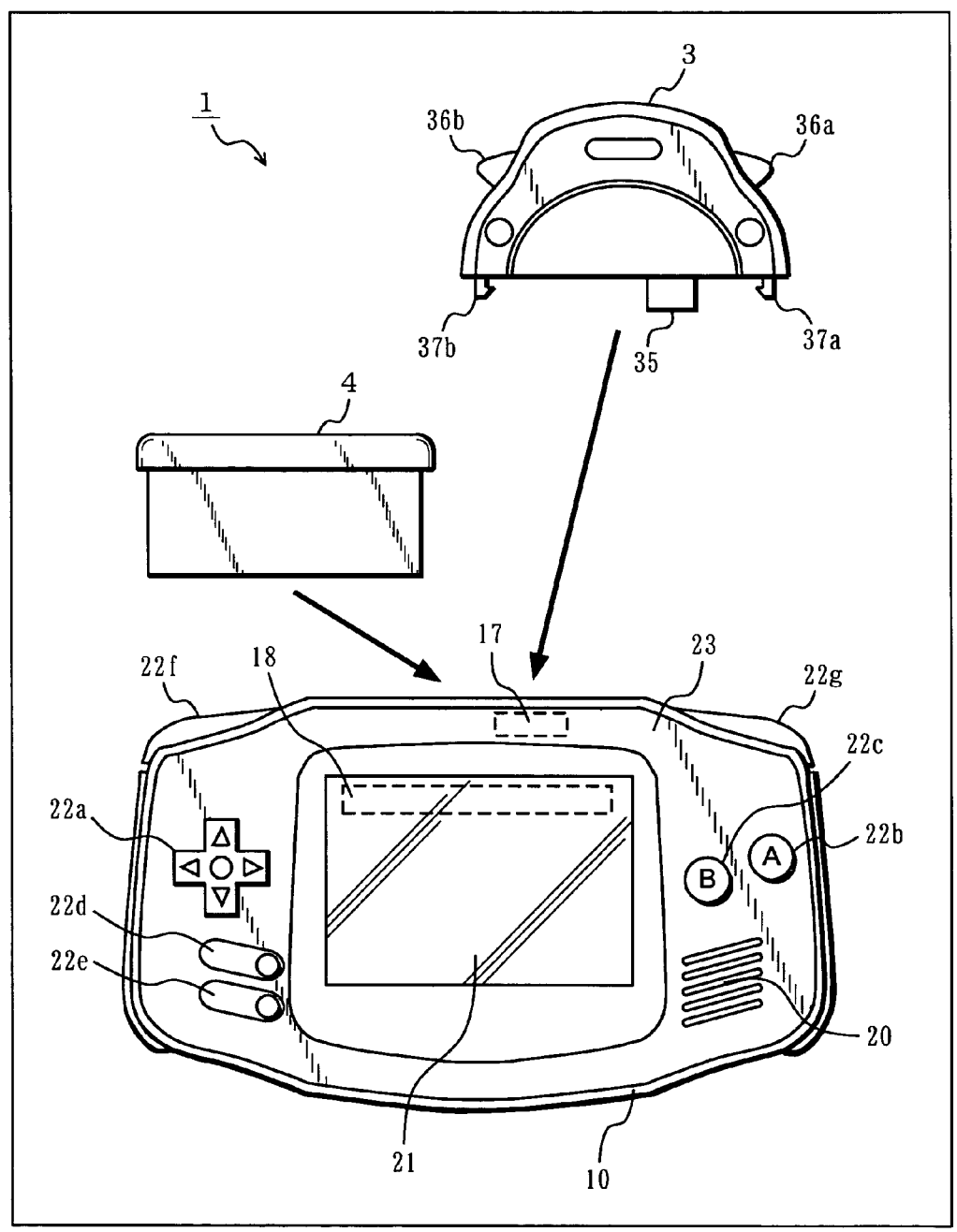
FIG. 1 is an external view of a game machine 1 included in a game system.

First, the configuration of a game machine will be described. FIG. 1 is an external view of a game machine 1 included in the game system. In the present embodiment, the first to third game machines all have the same configuration and thus all have a configuration shown in FIG. 1.

In FIG. 1, the game machine 1 includes a main unit 10 of the game machine, a game cartridge (hereinafter simply referred to as a "cartridge") 4, and a wireless communication unit 3. Specifically, the game machine 1 is configured by installing the cartridge 4 and the wireless communication unit 3 in the main unit 10 of the game machine. The cartridge 4 is used as an information storage medium to store a game program and the like. By installing the cartridge 4 in the main unit 10 of the game machine, a semiconductor memory and the like (a ROM 41 and a backup RAM 42 shown in FIG. 2) contained in the cartridge 4 are electrically connected to the main unit 10 of the game machine. The main unit 10 of the game machine has a cartridge insertion opening (not shown) provided on the top backside thereof to install or uninstall the cartridge 4 at will. A connector 18 (a dashed-line region in the drawing) is provided near the bottom surface of the insertion opening to establish an electrical connection with the cartridge 4. The wireless communication unit 3 is used to establish wireless communication between the game machine 1 and other game machines. A connector 17 (a dashed-line region in the drawing) is provided on the top backside of the main unit 10 of the game machine to establish an electrical connection with a connector 35 of the wireless communication unit 3. In the case where the wireless communication unit 3 is installed in the main unit 10 of the game machine, communication data to be sent from other game machines is output to the main unit 10 of the game machine and communication data to be output from the main unit 10 of the game machine is sent to other game machines.

The main unit 10 of the game machine has a housing 23. A liquid crystal display (LCD) 21 is provided in the central region of the main surface (the surface shown in the drawing) of the housing 23. A speaker 20 and control switches 22a to 22g are provided in free outer regions across the LCD 21 and at a side surface of the housing 23. The contents of operation instructions for the control switches 22a to 22g are different depending on the content of a game program executed by the game machine 1. In the present embodiment, the cross key 22a is a switch used to instruct a moving direction of a player character in a game space to be operated by the player. The A button 22b is a switch used to instruct the player character to launch a spell attack.

The wireless communication unit 3 has the connector 35 provided at the bottom thereof; a pair of knobs 36a and 36b provided at sides thereof; and a pair of hooks 37a and 37b provided at the bottom thereof where the connector 35 is provided. The knobs 36a and 36b protrude from the right and left sides of the wireless communication unit 3. By pulling the knobs 36a and 36b together inwardly from the sides, the hooks 37a and 37b protruding at the bottom accordingly move outwardly. When the pulling of the knobs 36a and 36b is stopped, because the knobs 36a and 36b are being energized outwardly, the hooks 37a and 37b move inwardly. The main unit 10 of the game machine has hook openings (not shown) provided therein to catch the hooks 37a and 37b. The wireless communication unit 3 is installed in the main unit 10 of the game machine by connecting the connector 35 of the wireless communication unit 3 to the connector 17 of the main unit 10 of the game machine and catching the hooks 37a and 37b into the hook openings. An antenna used to establish wireless communication between the wireless communication unit 3 and other game machines is formed on a board in the housing and thus is not exposed outside the housing.

Figure 2:
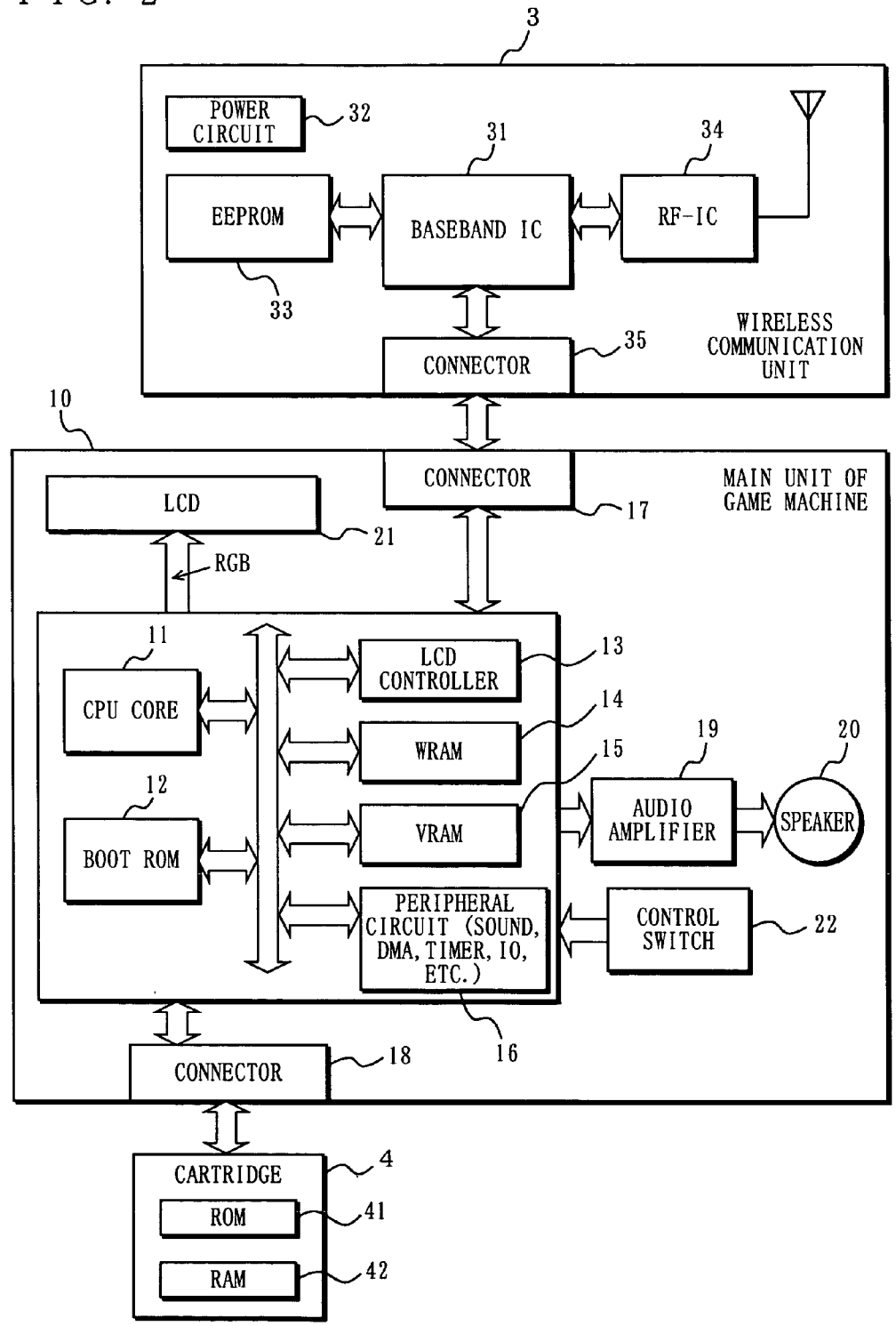
FIG. 2 is a functional block diagram of the game machine 1.

FIG. 2 is a functional block diagram of the game machine 1. In FIG. 2, the main unit 10 of the game machine has a central processing unit (CPU core) 11, a boot ROM 12, an LCD controller 13, a working RAM (WRAM) 14, a video RAM (VRAM) 15, a peripheral circuit 16, and an audio amplifier 19, in addition to the aforementioned components. The wireless communication unit 3 has a baseband IC 31, a power circuit 32, an EEPROM (Electrically Erasable Programmable Read-Only Memory) 33, and an RF-IC (Radio Frequency-IC) 34, in addition to the aforementioned components. The cartridge 4 has a ROM 41 and a backup RAM 42.

The ROM 41 has stored therein a game program which describes the content of a game to be played in the game machine 1 and the image and sound data of the game program. In addition, the ROM 41 has stored therein a game serial number (GSN) which indicates the type of the game program and the game title. The CPU core 11 operates in a game processing mode based on the game program stored in the ROM 41. The CPU core 11 is connected to each component via a predetermined bus, and is also connected to the connectors 17 and 18. Data input through the connectors 17 and 18 is output to the CPU core 11. In addition, data processed by the CPU core 11 can be output to the connectors 17 and 18.

The CPU core 11 executes a boot program stored in the boot ROM 12 and operates in a game processing mode based on the game program stored in the ROM 41. When the cartridge 4 is installed in the main unit 10 of the game machine, the CPU core 11 accesses the ROM 41 via the connector 18. In addition, the CPU core 11 performs game processing based on an operation signal input by the control switches 22 and the game program, stores data being processed in the WRAM 14, and temporarily stores image data in the VRAM 15.

In the case where the CPU core 11 operates in a game processing mode, the WRAM 14 has stored therein the game program, processing data, a send frame in which data used to perform transmission to other game machines is described, and the like, and is appropriately used as a storage region necessary for processes performed by the CPU core 11. In the case where the game machine 1 sends the send frame to other game machines, the send frame stored in the WRAM 14 is used and the send frame is output to the wireless communication unit 3 via the connector 17 in response to an instruction from the CPU core 11. A receive frame received from other game machines via the wireless communication unit 3 is processed by the CPU core 11 and stored in the WRAM 14 appropriately.

The audio amplifier 19 has a D/A conversion circuit and an amplification circuit. The audio amplifier 19 converts sound data which is based on the processing result of the game program performed by the CPU core 11 into a sound signal (analog signal), appropriately amplifies the sound signal, and then outputs the amplified audio signal through the speaker 20 as speech, music, and sound effects.

The CPU core 11 performs image processing using the storage regions of the WRAM 14 and the VRAM 15. The CPU core 11 renders a game image to be displayed on the LCD 21 using the WRAM 14 and the VRAM 15. Specifically, the CPU core 11 generates data of a game image to be displayed on the LCD 21 and stores the data in the VRAM 15. The LCD controller 13 performs display control to display the image data stored in the VRAM 15 on the LCD 21 and displays the image on the LCD 21. The VRAM 15 has temporarily stored therein image data having been processed by the CPU core 11.

The peripheral circuit 16 performs sound processing, a DMA (Direct Memory Access) operation, a timer operation, input-output control, and the like.

In the ROM 41 of the cartridge 4, a game program, various data used in the game program, a GSN, and the game title are permanently stored. In the backup RAM 42, game data obtained by executing the game program is stored rewritably and nonvolatilely via the connector 18. Game data stored in the backup RAM 42 includes backup data which indicates the progress at the time when the game is finished, for example. The backup RAM 42 may be composed of a flash memory or the like.

The baseband IC 31 of the wireless communication unit 3 receives data to send to other game machines, from the main unit 10 of the game machine via the connectors 17 and 35, encodes the data, and then sends the encoded data to the RF-IC 34. The RF-IC 34 modulates the data sent from the baseband IC 31 and sends the modulated data via radio waves from an antenna. In addition, radio waves having been sent from other game machines are received by the antenna and the received radio waves are demodulated by the RF-IC 34. Then, a signal demodulated by the RF-IC 34 is output to the baseband IC 31. The baseband IC 31 decodes the demodulated signal to demodulate data and transfers the data to the main unit 10 of the game machine via the connectors 35 and 17. In the EEPROM 33, an ID of the game machine 1 and a user name which is input by a user are stored nonvolatilely. The ID of the game machine 1 may be a unique serial number assigned by the manufacturer or may be identification information which is randomly created by the game machine 1. The power circuit 32 supplies power to each component of the wireless communication unit 3. In the present embodiment, short-range wireless communication is used, which uses very weak radio waves.

Figure 3:
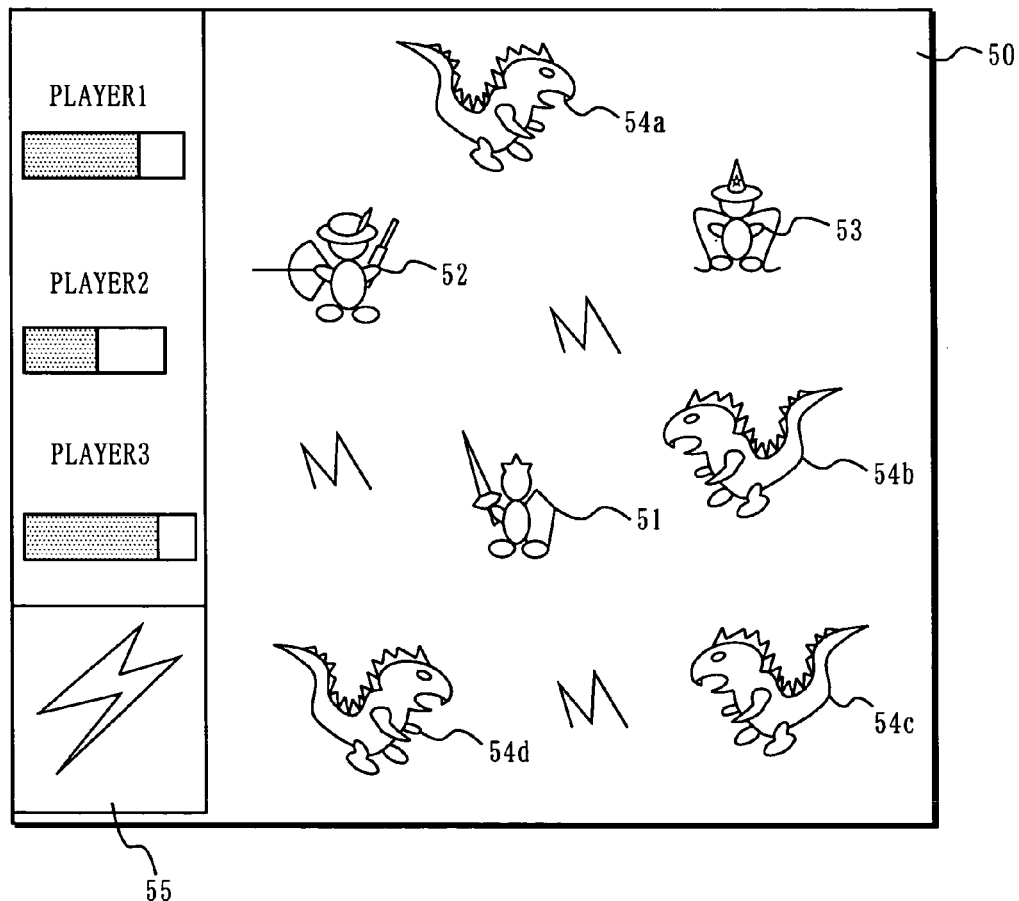
FIG. 3 is a diagram showing an exemplary game screen of a game machine according to an embodiment of the present invention.

Now, game processing which is performed by each game machine using the game program stored in the cartridge 4 will be described below. Before giving the detailed description of the game processing, first, the outline of the game performed in the present embodiment will be described with reference to FIGS. 3 to 8. FIG. 3 is a diagram showing an exemplary game screen of a game machine according to the present embodiment. As shown in FIG. 3, a region 50 which is a part of a game space is displayed on the LCD 21 of the game machine.

In the region 50, a first player character 51, a second player character 52, a third player character 53, and four enemy characters 54*a* to 54*d* are displayed. The first player character 51 is a character to be operated by a first player, the second player character 52 is a character to be operated by a second player, and the third player character 53 is a character to be operated by a third player. The game of the present embodiment is played such that each player character battles against the enemy characters by attacking the enemy characters using weapons or spells. Specifically, the player moves his/her player character in the game space using the cross key 22*a* and causes the player character to attack the enemy characters by casting a spell using the A button 22*b*.

In the present embodiment, a game screen to be displayed is uniform between the game machines (the first to third game machines). That is, the same game screen is displayed on all game machines. Note, however, that in another embodiment, a game screen to be displayed is not necessarily the same between the game machines; that is, the game machines may display different regions of the game space. For example, the game machines may display regions which focus on their respective player characters operated by the players thereof, or may display the entire game space.

Moreover, as shown in FIG. 3, a spell display icon 55 is displayed on the bottom left of the LCD 21. The spell display icon 55 indicates the type of spell the first player character 51 is currently able to use. In the present embodiment, the spell the first player character 51 can use is of three types: a fire spell, a water spell, and a thunder spell. The spell display icon 55 shown in FIG. 3 indicates that the thunder spell is currently able to be used. In addition, gauges which indicate player characters' energy levels are displayed on the left side of the LCD 21.

In the present embodiment, an attribute about a spell (an attribute parameter which will be described later) is assigned to each player (each game machine). Specifically, the first player is assigned with a water attribute, the second player is assigned with a thunder attribute, and the third player is assigned with a fire attribute. The type of spell the first player character 51 is currently able to use changes depending on the positional relationship between the players. The term "positional relationship between the players" means the actual positional relationship between the players and does not mean the positional relationship between the player characters in the game space. For example, in the case where the third player having a fire attribute is present near the first player, the first player character 51 can use a fire spell, and in the case where the second player having a thunder attribute is present near the first player, the first player character 51 can use a thunder spell. In the present embodiment, in addition to the type of spell, the power of spell (the amount of damage to the enemy characters by a spell) also changes depending on the positional relationship between the players. The positional relationship between the players will be described in detail below with reference to FIGS. 4 to 7.

Figure 4:
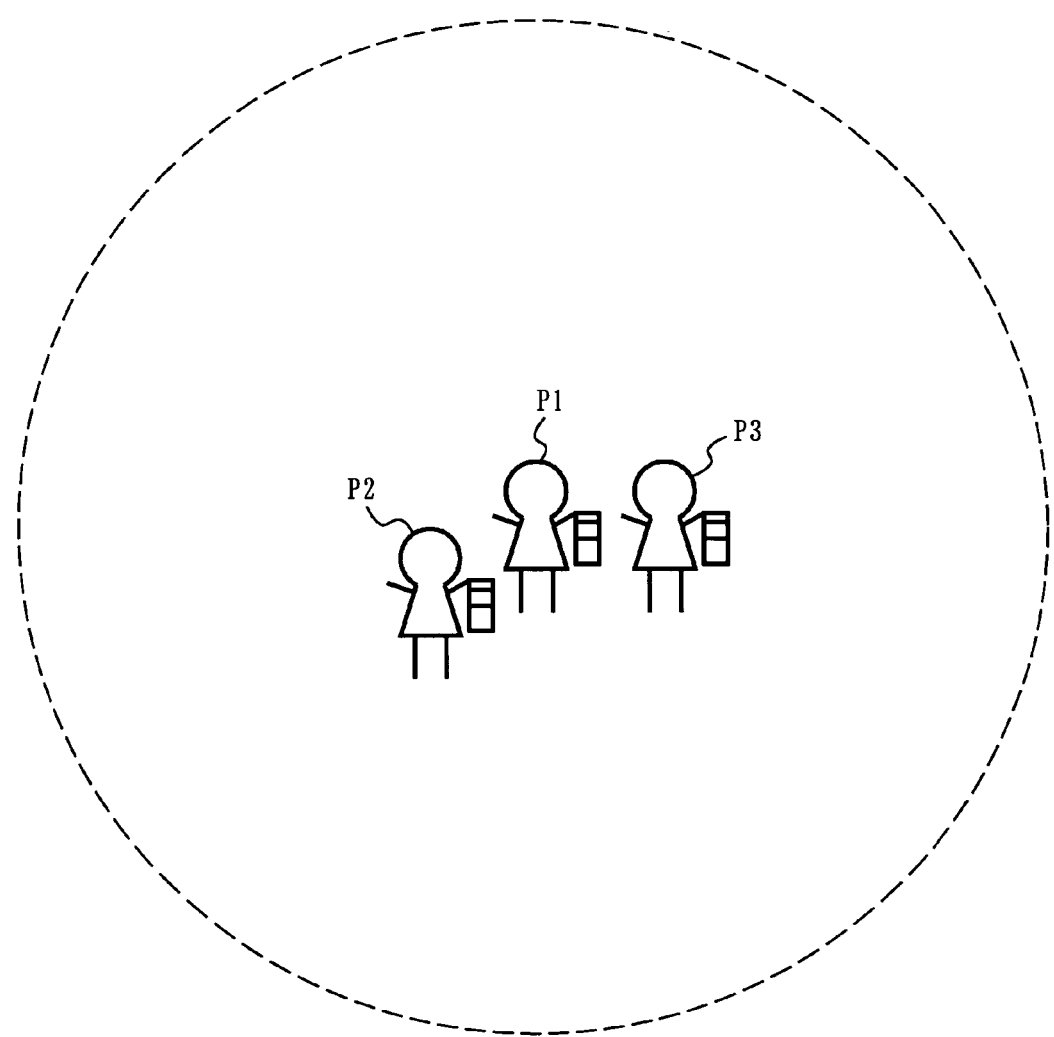
FIG. 4 is a diagram showing an exemplary positional relationship between players.

FIG. 4 is a diagram showing an exemplary positional relationship between players. In the example of FIG. 4, a second player P2 and a third player P3 are present near a first player P1. The first game machine determines the distance between the first player P1 and the second player P2 by detecting the link strength of wireless communication therebetween. Specifically, if the link strength is great, the distance is determined to be short, and if the link strength is small, the distance is determined to belong. The first game machine determines the distance between the first player P1 and the third player P3 in the same manner as that described above. In this manner, the first game machine identifies the positional relationships between the first player P1 and the second player P2 and between the first player P1 and the third player P3. In the present embodiment, the type of spell and the power of spell of the first player character changes depending on the positional relationship. Note that the dashed line shown in FIG. 4 indicates a communicable region of the first game machine.

Figure 5:
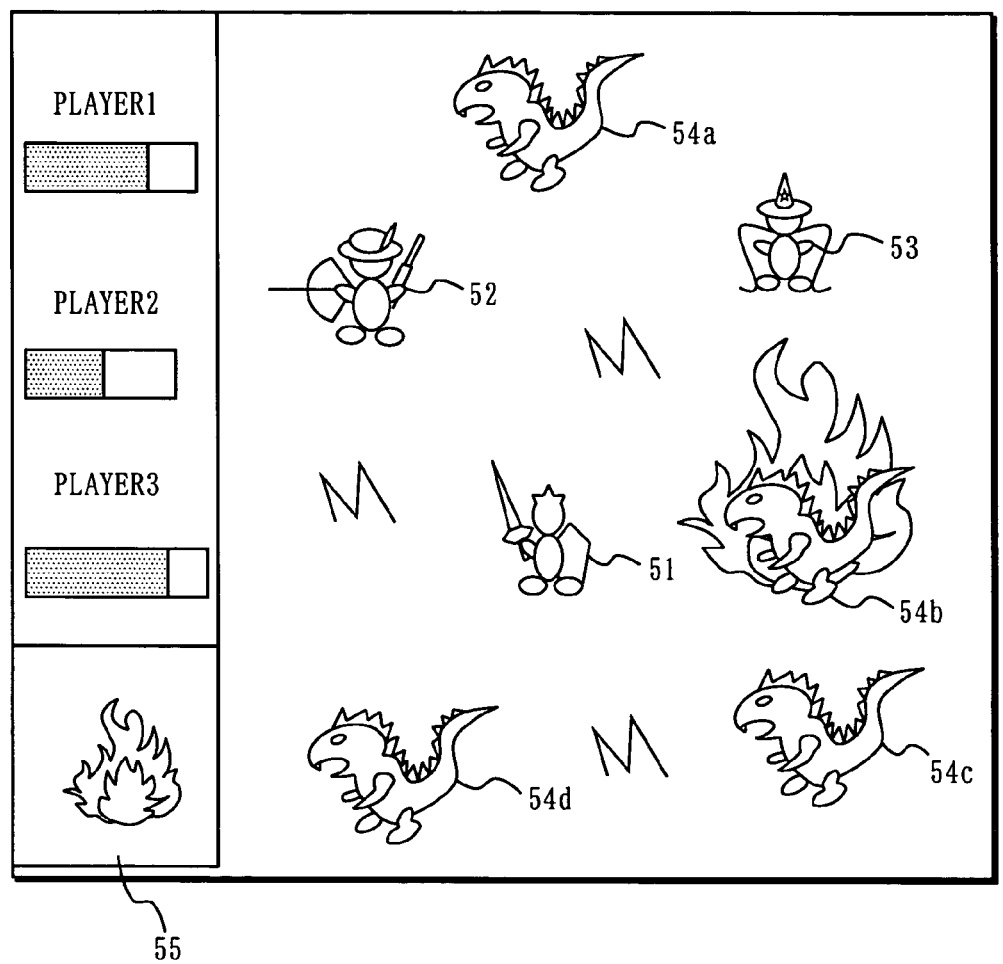
FIG. 5 is a diagram showing a game screen in the case where a first player character 51 has cast a spell in a state where the players are present at locations shown in FIG. 4.

FIG. 5 is a diagram showing a game screen in the case where the first player character 51 has cast a spell in a state where the players are present at locations shown in FIG. 4. In the present embodiment, in the case where the distance between the first, second, and third players is close as shown in FIG. 4, a fire spell is selected. In this case, as shown in FIG. 5, an effect image of a fire spell is displayed on a targeted enemy character (enemy character 54b in FIG. 5). Here, the spell display icon 55 is changed to an icon representing a fire spell. The spell display icon 55 is displayed before spell casting is instructed by the player. This allows the player not only to know which type of spell has been cast but also to predict which type of spell will be cast in the current situation (i.e., the current positional relationship between the players). The game screen shown in FIG. 5 is displayed on all game machines. Specifically, a game screen is displayed on all game machines, in which a spell has been cast by the first player's pressing of the A button 22b.

Figure 6:
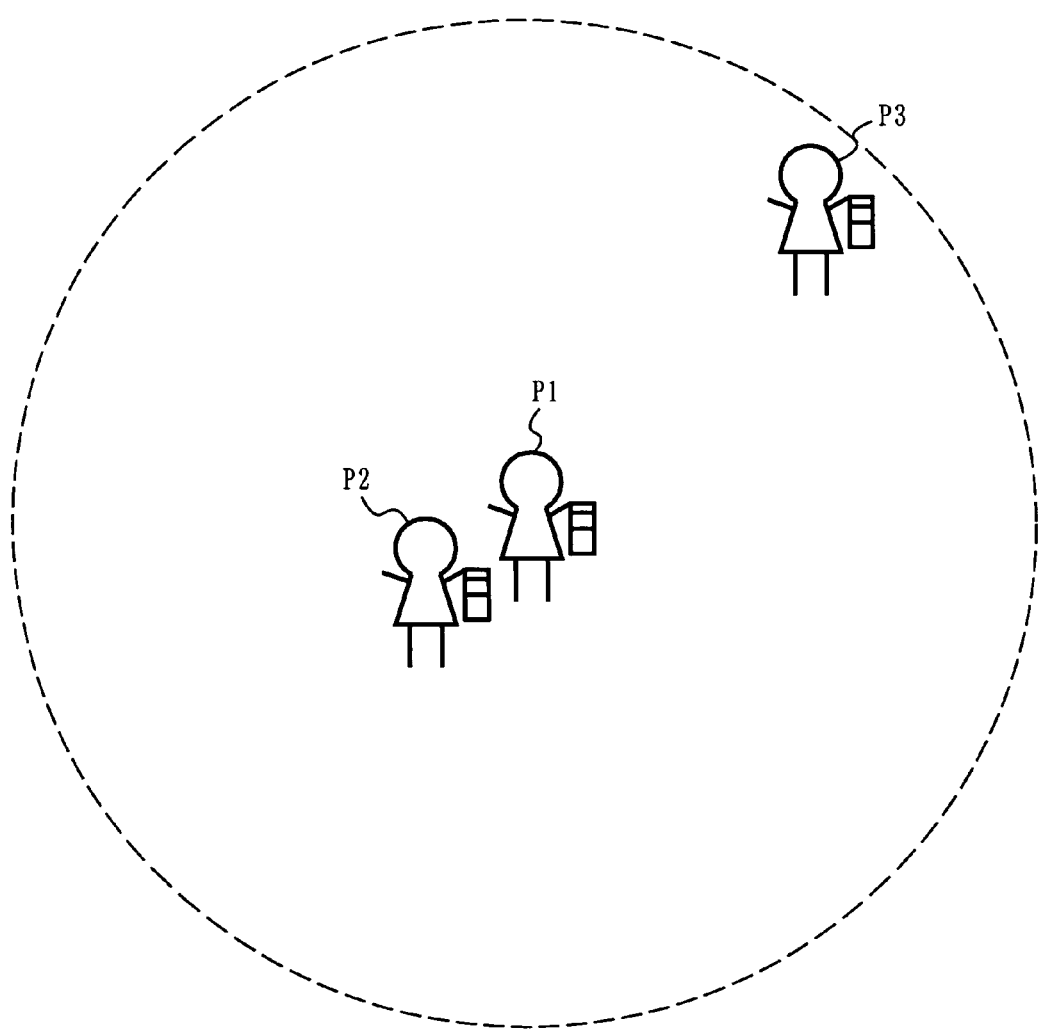
FIG. 6 is a diagram showing another exemplary positional relationship between the players.
Figure 7:
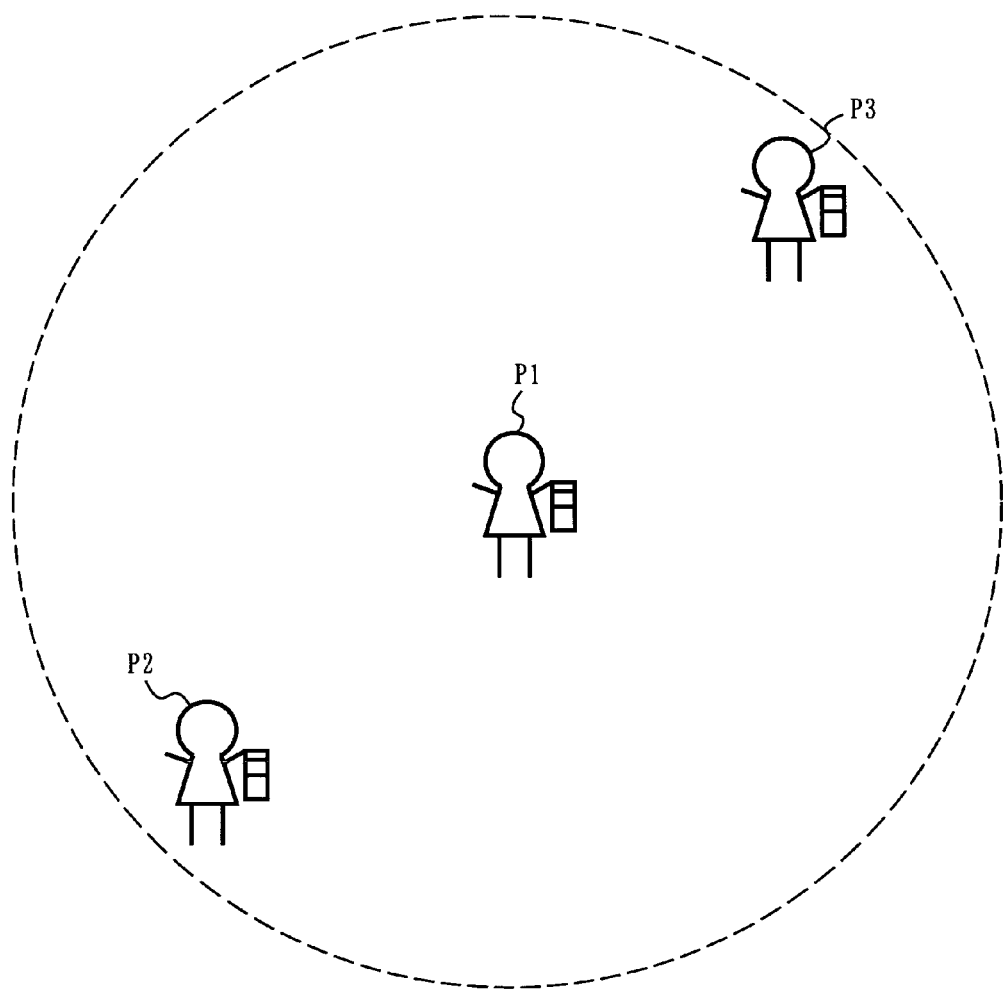
FIG. 7 is a diagram showing still another exemplary positional relationship between the players.

FIGS. 6 and 7 are diagrams showing other exemplary positional relationships between the players. In the example shown in FIG. 6, the second player P2 is present near the first player P1 and the third player P3 is present far from the first player P1. In the present embodiment, in the case where the players have the positional relationship shown in FIG. 6, a thunder spell is selected. On the other hand, in the example shown in FIG. 7, both the second player P2 and the third player P3 are present far from the first player P1. In the present embodiment, in the case where the players have the positional relationship shown in FIG. 7, a water spell is selected.

As have been shown in FIGS. 4 to 7, in the present embodiment, the type of spell changes depending on the positional relationship between the first, second, and third players. That is, game processing (spell attack processing) in which a player character launches a spell attack is performed such that the type of spell changes depending on the link strength between the game machines. In the illustrative embodiments, by thus changing the game processing depending on the link strength, the actual positional relationship between the players is reflected to the way the game proceeds. For example, in the example of FIG. 4, since the third player having a fire attribute is present near the first player, a fire spell is selected. In the example of FIG. 6, since the second player having a thunder attribute is present near the first player, a thunder spell is selected. In this manner, the present embodiment provides players with an unconventional, new way of playing the game in which the actual positional relationship between the players influences the way the game proceeds.

Figure 8:
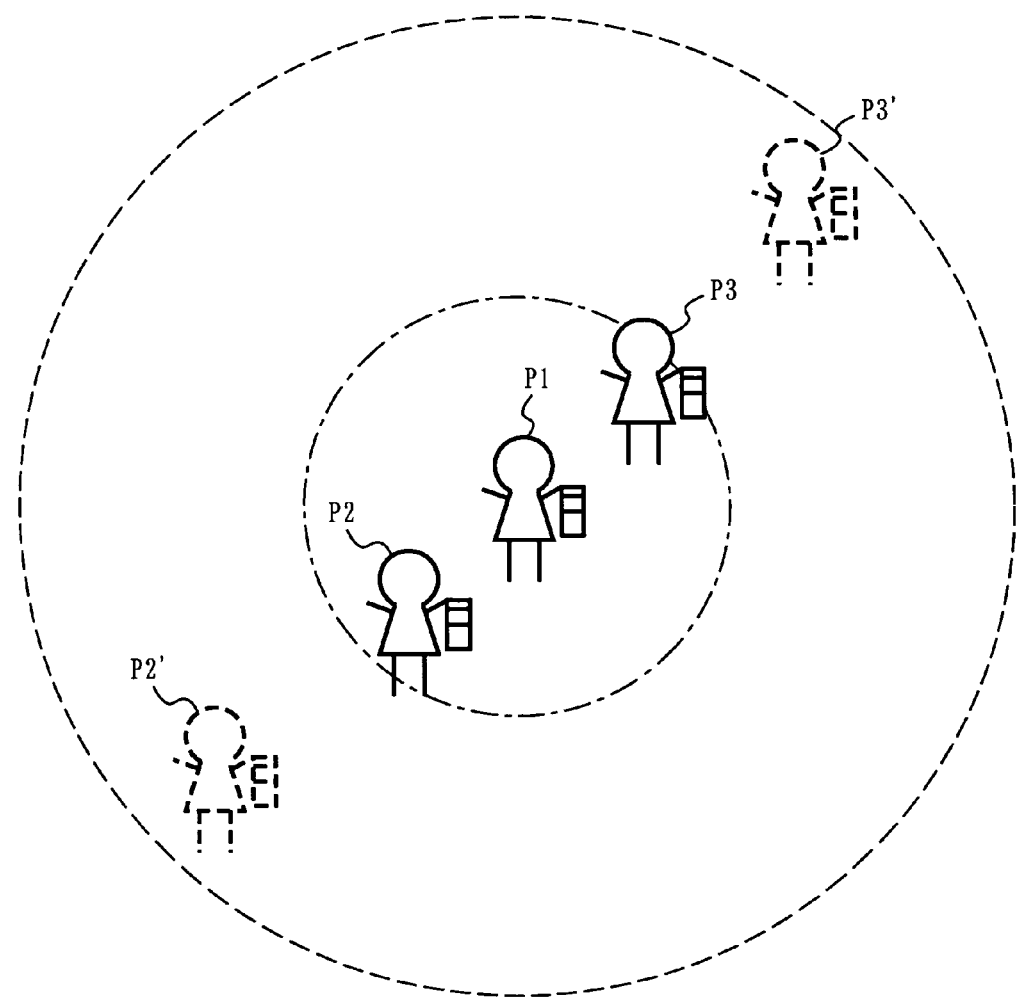
FIG. 8 is a diagram for describing wide-range game processing and narrow-range game processing.

In the present embodiment, the level of influence to be exerted by the link strength on the result of game processing can be changed by the player. Specifically, the player can select in advance either wide-range game processing or narrow-range game processing. FIG. 8 is a diagram for describing the wide-range game processing and the narrow-range game processing. In FIG. 8, players P1 to P3 shown with solid lines indicate the players' actual locations, and players P2' and P3' shown with dashed lines indicate the players' virtual locations where the players are not actually present but are assumed to be present. In the case where the narrow-range game processing is selected, the first game machine adjusts the numeric value of the link strength such that the location of the second player P2 is assumed to be the location of the player P2'. Similarly, in the case where the narrow-range game processing is selected, the first game machine adjusts the numeric value of the link strength such that the location of the third player P3 is assumed to be the location of the player P3'. Thus, by selecting the narrow-range game processing, without the need for the players to be actually located with a predetermined distance therebetween, the players can allow their respective game machines to perform game processing which is performed when the players are located with a predetermined distance therebetween. On the other hand, in the case where the wide-range game processing is selected, the link strength is not adjusted. That is, the first game machine determines that the actual players' locations are the players' locations.

As described above, as shown in FIG. 8, by allowing the player to change the level of influence to be exerted by the link strength, even in a small space the players can play the game as if the players were in a large space. For example, in the case of playing in the room, the narrow-range game processing may be selected, and in the case of playing in the park, the wide-range game processing may be selected.

Figure 9:
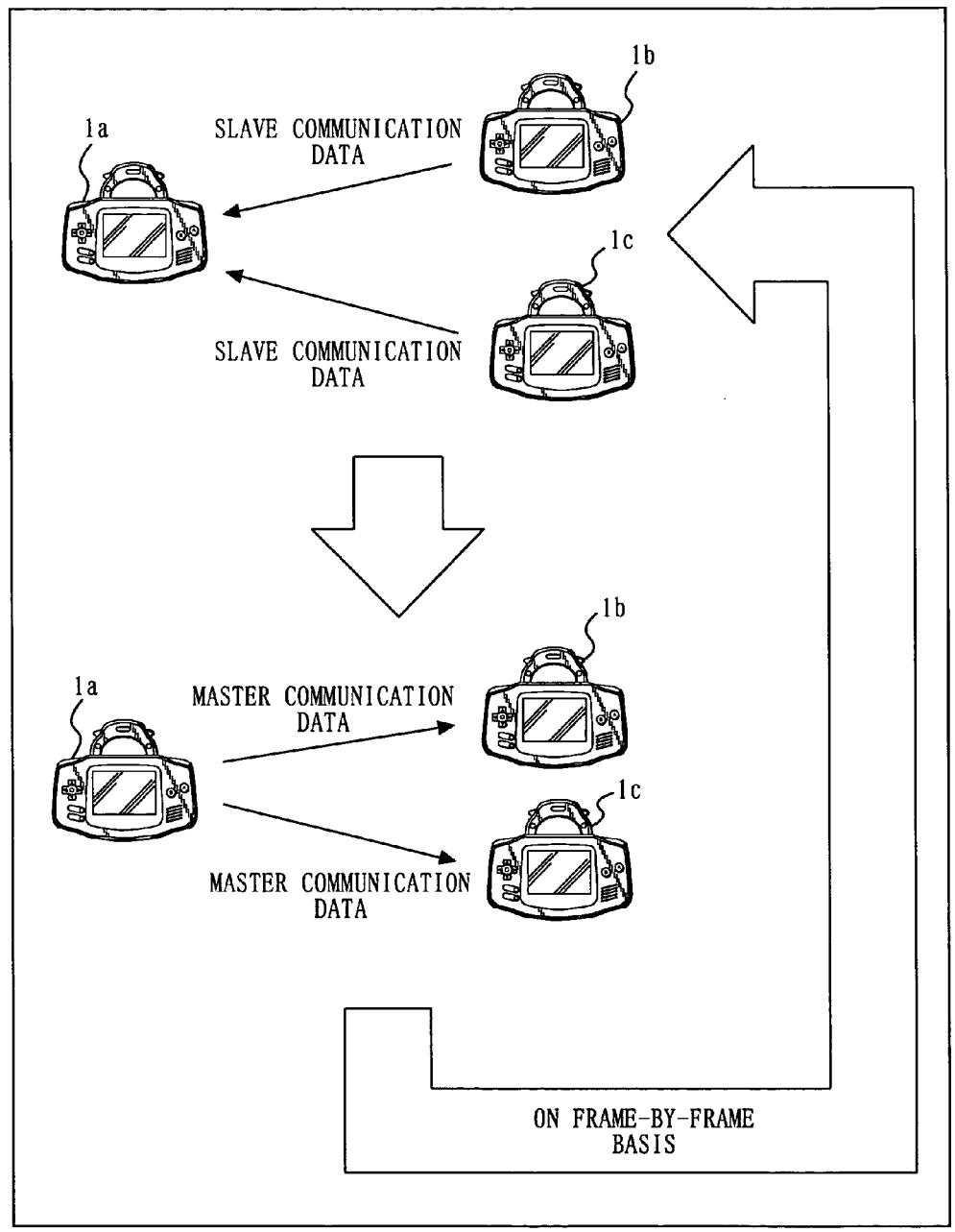
FIG. 9 is a diagram for describing a communication procedure in the game system according to the embodiment of the present invention.

Next, game processing to be performed by each game machine of the present embodiment will be described. The following mainly describes processing in which player characters move around in a game space and the player characters attack enemy characters using spells. First, the communication procedure between game machines in the game system according to the present embodiment will be described. FIG. 9 is a diagram for describing a communication procedure in the game system according to the present embodiment. In the present embodiment, one of the game machines acts as a master machine and other game machines act as slave machines. Here, a first game machine 1a acts as a master machine and other game machines act as slave machines. A second game machine 1b is referred to as a "first slave machine" and a third game machine 1c is referred to as a "second slave machine".

In FIG. 9, in the case where game processing for proceeding the game is performed, data necessary for the game processing is sent to the first game machine 1a which acts as the master machine from the slave machines (the second and third game machines 1b and 1c). The data is called "slave communication data". The master machine performs the game processing using the slave communication data. The result of the game processing is sent to each slave machine. This data is called "master communication data". The game machines (the master and slave machines) each update a game image based on the processing result and displays the updated image. In the game system according to the present embodiment, the game proceeds by repeating the processes of sending slave communication data to the master machine from each slave machine, performing game processing by the master machine, and sending master communication data to each slave machine from the master machine, on a frame-by-frame basis. By sharing the result of the game processing obtained by the master machine with all game machines, the way the game proceeds can be made consistent in all game machines.

Figure 10A:
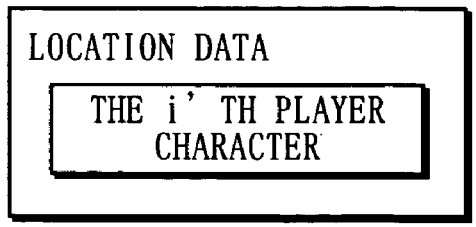
FIGS. 10A and 10B are diagrams showing data configurations of master communication data and slave communication data of the embodiment of the present invention.
Figure 10B:
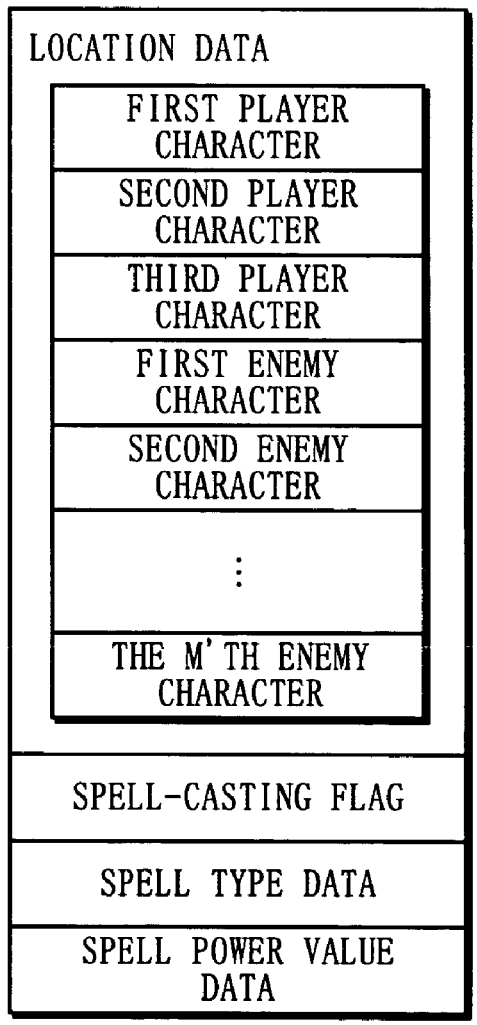

FIGS. 10A and 10B are diagrams showing data configurations of master communication data and slave communication data of the present embodiment. FIG. 10A is a diagram showing a data configuration of slave communication data and FIG. 10B is a diagram showing a data configuration of master communication data. As shown in FIG. 10A, the slave communication data includes location data which indicates the location of a player character in the game space. In the present example, slave communication data from the i'th game machine (i is an integer equal to or greater than 2) includes the location data of the i'th player character. That is, the slave machines each send the location data of the player characters corresponding to their respective slave machines (i.e., the player characters to be operated by the players of their respective slave machines) to the master machine.

As shown in FIG. 10B, the master communication data includes location data, spell-casting flag, spell type data, and spell power value data. The location data of the master communication data includes the location data of all game characters appearing in the game space. That is, the location data includes the location data of each player character and the location data of each enemy character. Note that in another embodiment, the master communication data does not need to include the location data of a game character which is not displayed on the screen.

In FIG. 10B, the spell-casting flag is data which indicates that a spell has been cast by performing game processing by the master machine. Specifically, when a spell has been cast, the spell-casting flag is set to "1", and when a spell has not been cast, the spell-casting flag is set to "0". The spell type data indicates the type of spell currently being selected. The spell type data is sent to each slave machine regardless of whether the spell has been cast or not. The spell power value data indicates the power of the spell having been cast. Specifically, damage to be given to an enemy character is determined based on the value (spell power value) indicated by the spell power value data. In the case where the spell has not been cast, null data is sent to each slave machine as spell power value data.

Figures 11, 12:
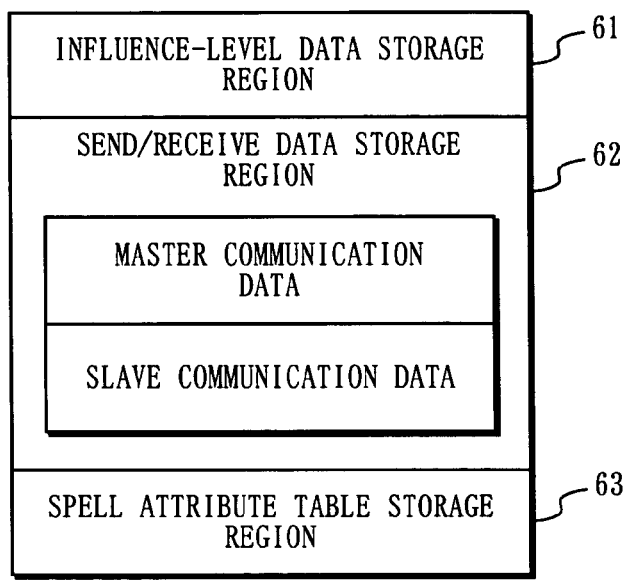
FIG. 11 is a diagram showing a memory map of a WRAM 14 of the game machine.
FIG. 12 is a diagram showing an exemplary spell attribute table.

Now, data to be used in processes by the game machine will be described. FIG. 11 is a diagram showing a memory map of a WRAM 14 of the game machine. In the WRAM 14 at the time of execution of game processing, an influence-level data storage region 61, a send/receive data storage region 62, and a spell attribute table storage region 63 are set. The influence-level data storage region 61 stores influence-level data. The influence-level data indicates the level of influence to be exerted by the link strength on the result of game processing (see FIG. 8). The influence-level data can take two values, "0" or "1". The influence-level data of "0" means that the narrow-range game processing has been selected by the player. On the other hand, the influence-level data of "1" means that the wide-range game processing has been selected by the player. The send/receive data storage region 62 stores the aforementioned master communication data and slave communication data. The spell attribute table storage region 63 stores a spell attribute table. The spell attribute table is used to determine the type of spell and the power of spell during the aforementioned spell attack processing. A specific example of the spell attribute table will be described below with reference to FIG. 12.

FIG. 12 is a diagram showing an exemplary spell attribute table. The spell attribute table is a table in which the type of attribute parameter and its reference value are associated with each other. The attribute parameter is used during spell attack processing. In FIG. 12, three types of attribute parameters (first to third attribute parameters) are used during spell attack processing. Each attribute parameter is associated with each game machine (each player). Specifically, the first attribute parameter is associated with the first game machine, the second attribute parameter is associated with the second game machine, and the third attribute parameter is associated with the third game machine. In addition, the attribute parameter has three type of values (a fire spell value, a water spell value, and a thunder spell value). The fire spell value is a reference value used to calculate the power of a fire spell, the water spell value is a reference value used to calculate the power of a water spell, and the thunder spell value is a reference value used to calculate the power of a thunder spell. These values vary between the attribute parameters, i.e., between the game machines. That is, the attribute parameter is information indicating the characteristics of each game machine.

In the example of FIG. 12, the first attribute parameter associated with the first game machine, i.e., the first player, has a fire spell value of −20, a water spell value of 120, and a thunder spell value of 20. That is, the first player has a characteristic of having a strong water attribute. Similarly, the second player has a characteristic of having a strong thunder attribute and the third player has a characteristic of having a strong fire attribute. In this manner, in the present embodiment, by assigning an attribute parameter to each game machine, each player can be provided with a characteristic.

Figure 13:
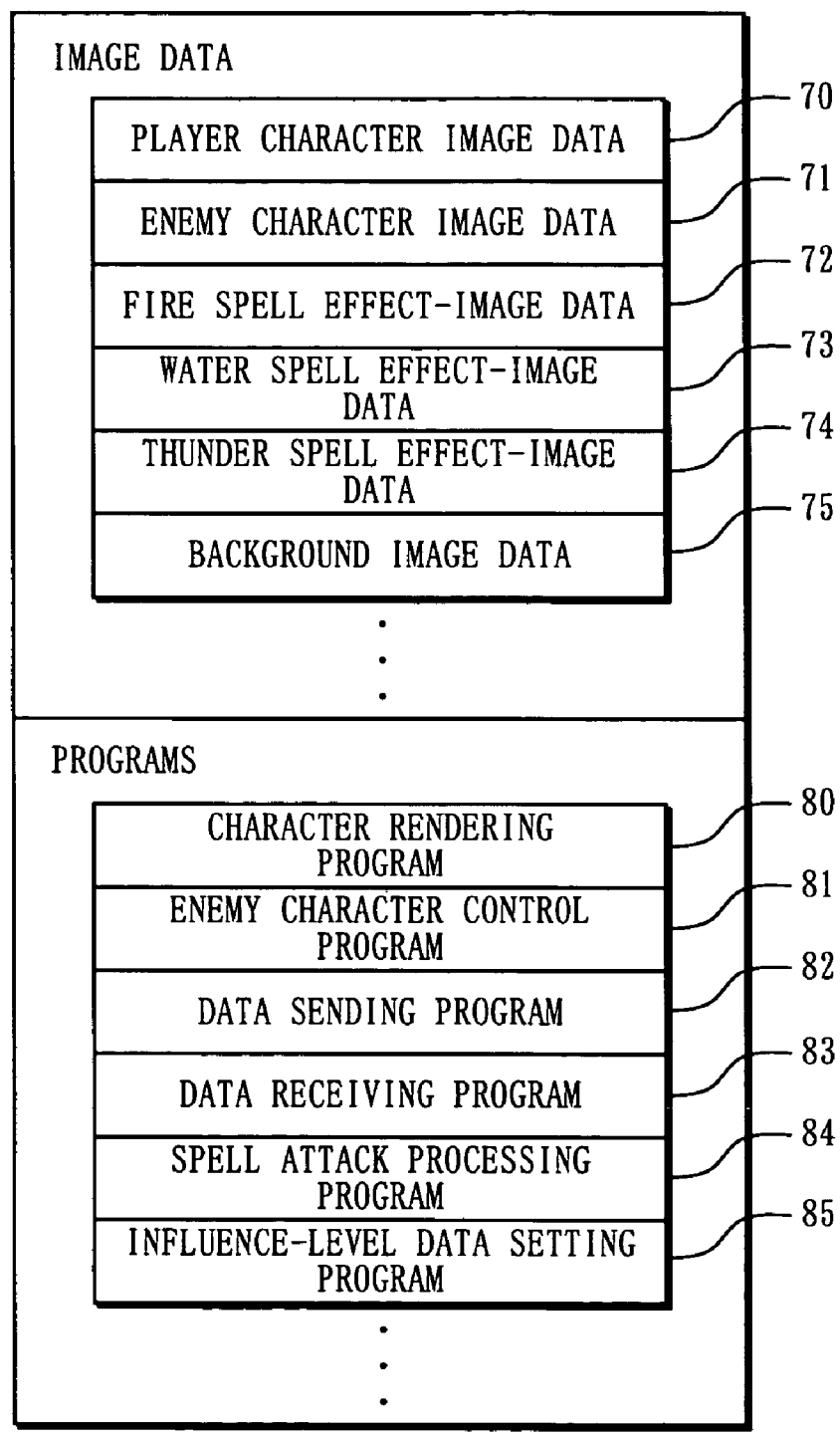
FIG. 13 is a diagram showing data stored in ROM 41 of a cartridge 4.

FIG. 13 is a diagram showing data stored in a ROM 41 of a cartridge 4. As shown in FIG. 13, in the ROM 41, image data and programs are stored. At the time of game processing, the CPU core 11 appropriately reads and uses the data stored in the ROM 41. The image data includes player character image data 70, enemy character image data 71, fire spell effect-image data 72, water spell effect-image data 73, thunder spell effect-image data 74, and background image data 75. The player character image data 70 represents images of player characters. The enemy character image data 71 represents images of enemy characters. The fire spell effect-image data 72 represents an effect image of a fire spell. The water spell effect-image data 73 represents an effect image of a water spell. The thunder spell effect-image data 74 represents an effect image of a thunder spell. The background image data 75 represents a background image (land map) of a game space.

The programs stored in the ROM 41 include a character rendering program 80, an enemy character control program 81, a data sending program 82, a data receiving program 83, a spell attack processing program 84, and an influence-level data setting program 85. The character rendering program 80 is used to render an image of each game character. The enemy character control program 81 is used to control the movement of the enemy characters in the game space. The data sending program 82 is used to send master communication data and slave communication data. The data receiving program 83 is used to receive master communication data and slave communication data. The spell attack processing program 84 is used to perform processing (spell attack processing) for determining the type of spell and the power of spell used when the player character launches a spell attack. The influence-level data setting program 85 is used to set influence-level data.

Figure 17:
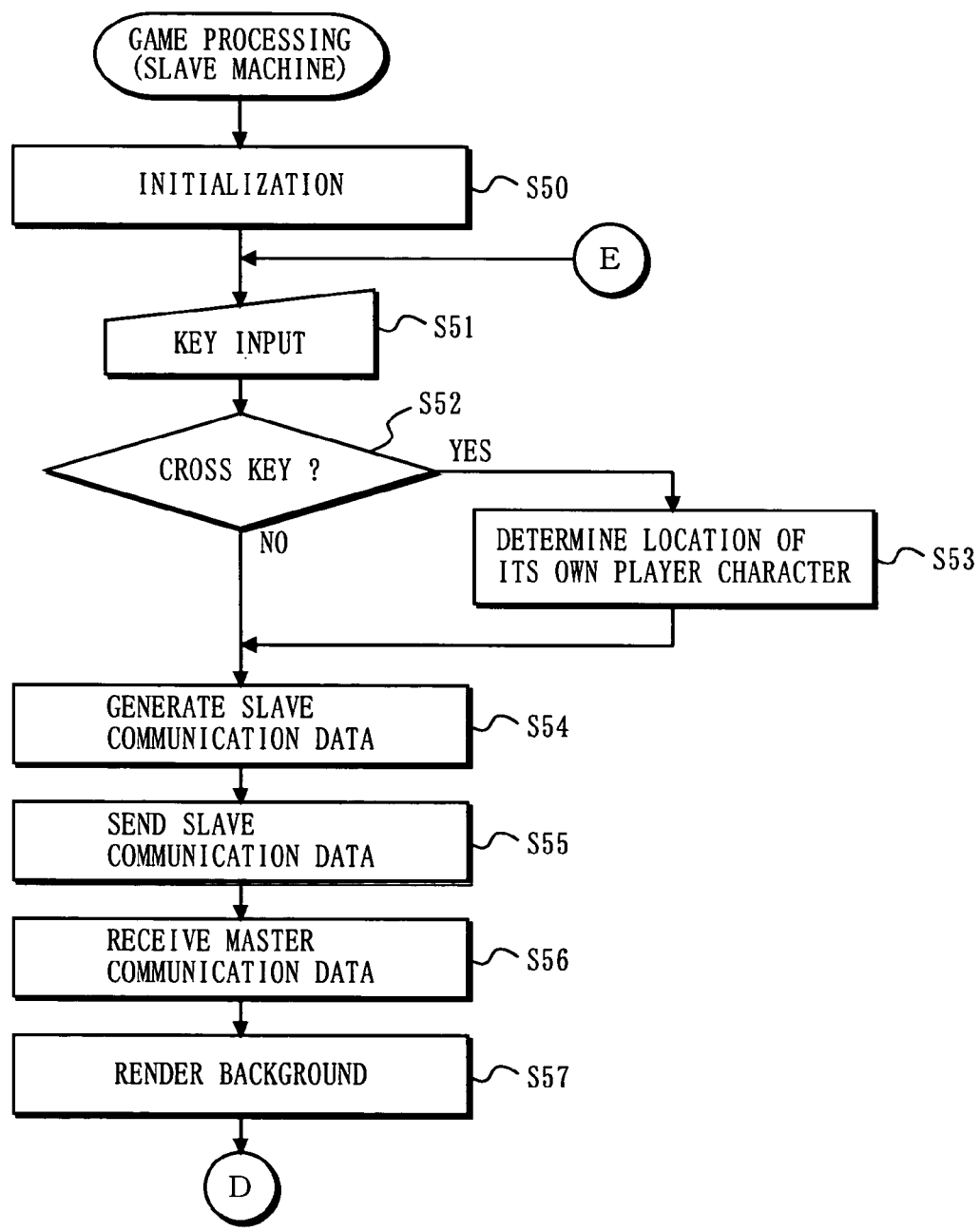
FIG. 17 is a flowchart showing the flow of game processing for a slave machine.
Figure 18:
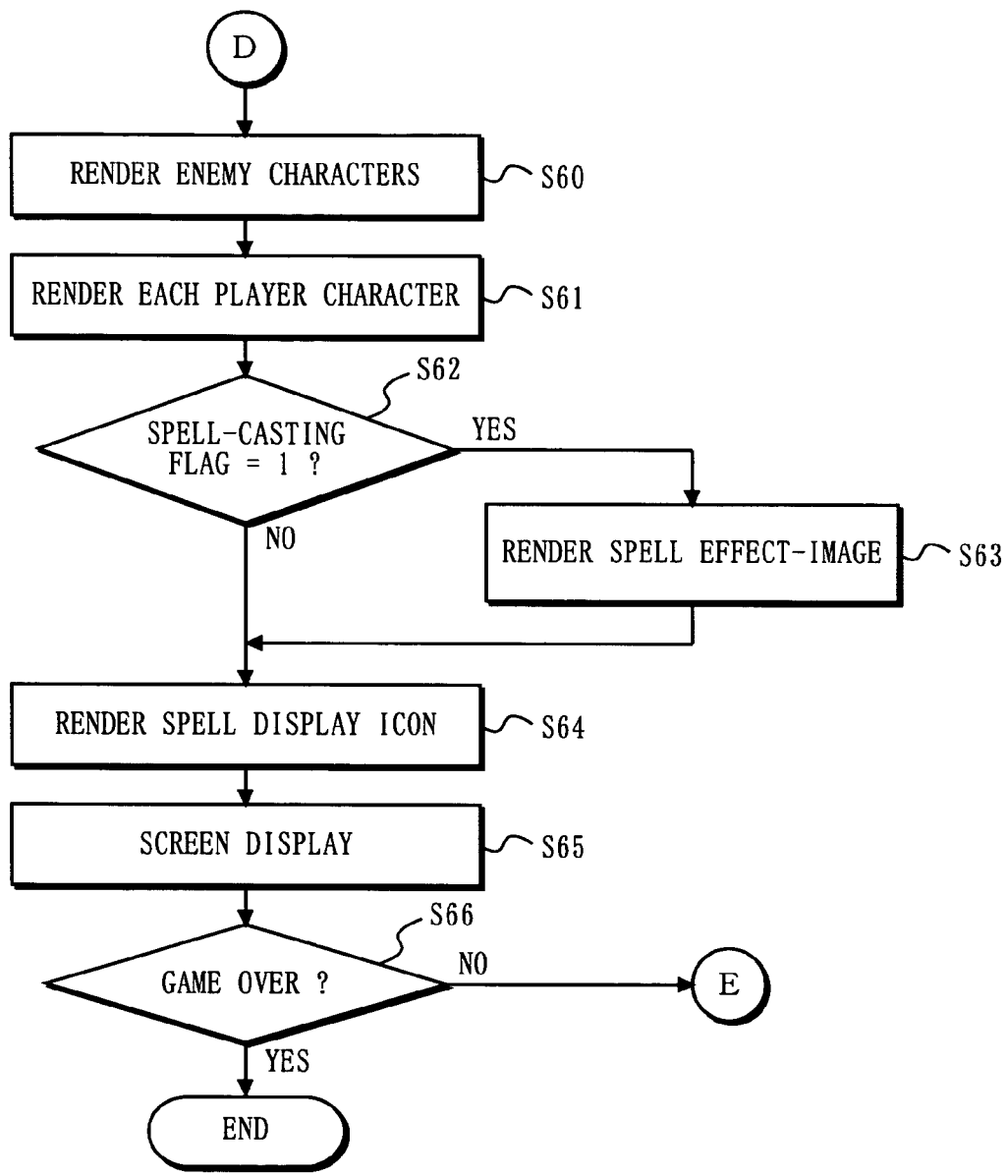
FIG. 18 is a flowchart showing the flow of the game processing for the slave machine.

Now the processes to be performed by each game machine of the present embodiment will be described in detail. Once the game machine is turned on, the CPU core 11 of the game machine executes a boot program stored in the boot ROM 12 and initializes each unit such as the WRAM 14. Then, the game program stored in the cartridge 4 is read into the WRAM 14, whereby the execution of the game program starts. The flowcharts for a master machine shown in FIGS. 14 to 16 and the flowcharts for a slave machine shown in FIGS. 17 and 18 illustrate processes to be performed after the above-described processes.

Figure 14:
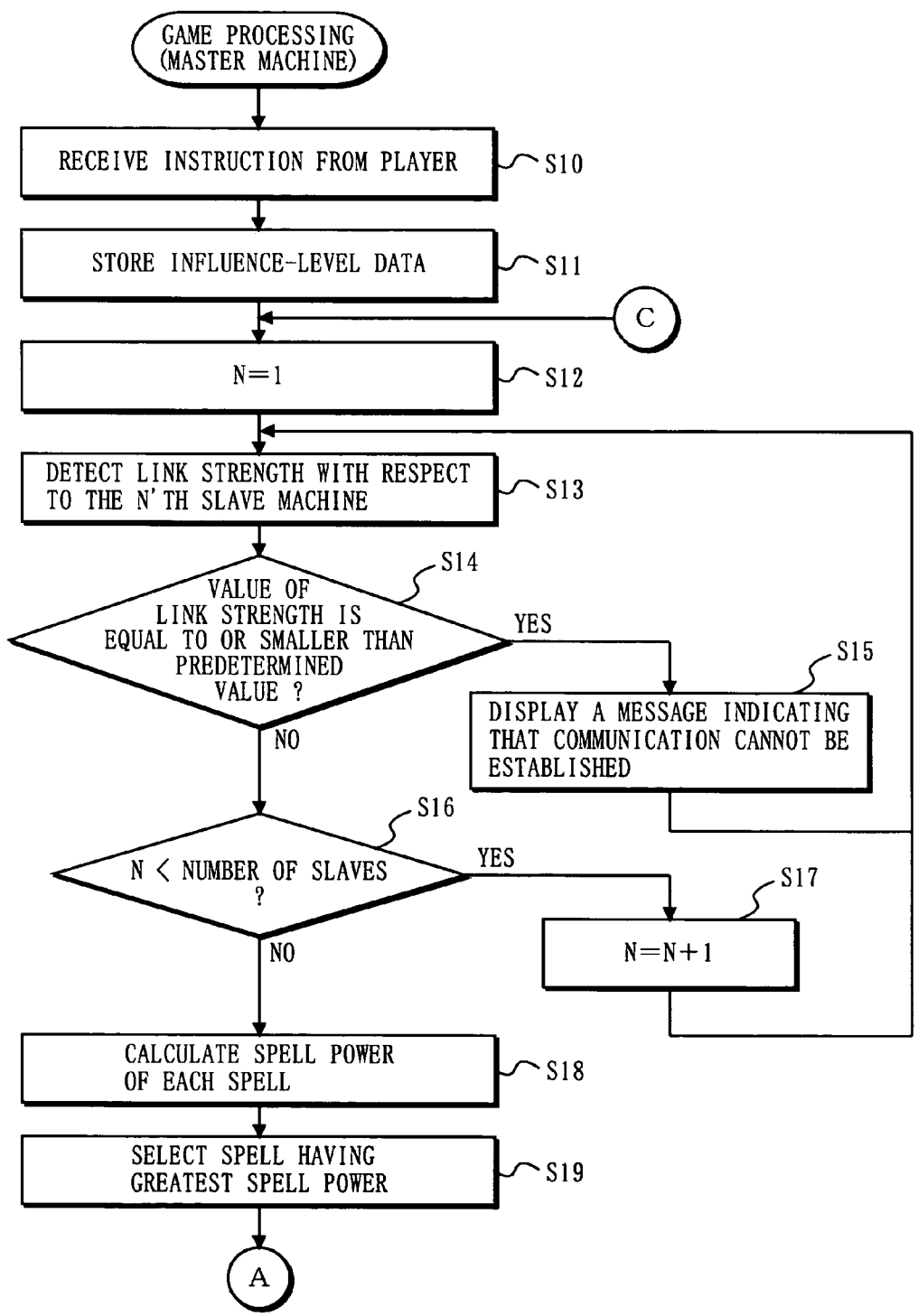
FIG. 14 is a flowchart showing the flow of game processing for a master machine.
Figure 15:
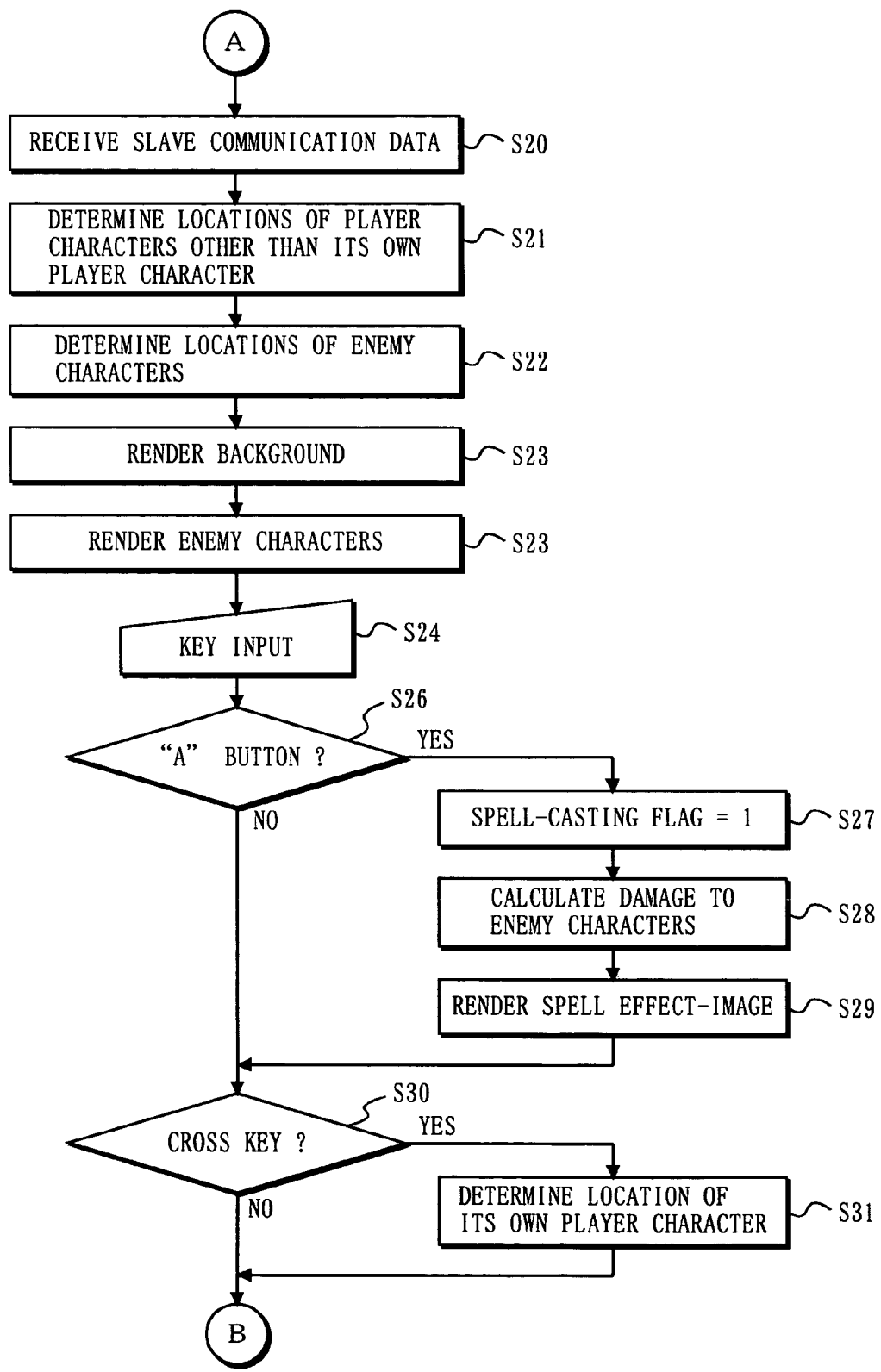
FIG. 15 is a flowchart showing the flow of the game processing for the master machine.
Figure 16:
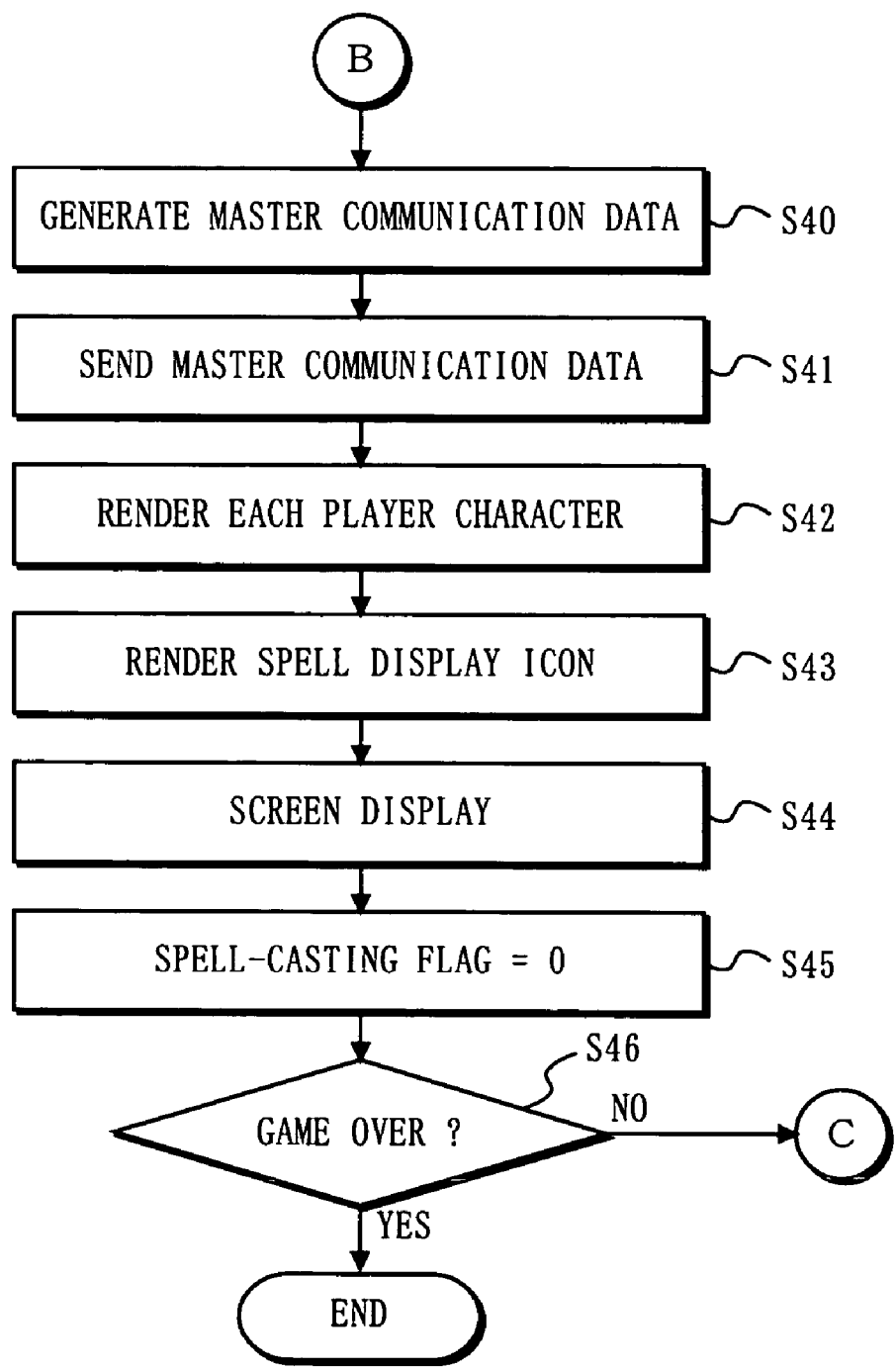
FIG. 16 is a flowchart showing the flow of the game processing for the master machine.

FIGS. 14 to 16 are flowcharts showing the flow of game processing for a master machine. First, at steps 10 and 11 (in the drawing, "S" refers to "step"), the influence-level data setting program 85 is executed, whereby influence-level data is set. Specifically, at step 10, the CPU core 11 receives an instruction from the player to set influence-level data. More specifically, the CPU core 11 receives an instruction through the control switch 22 to select either wide-range game processing or narrow-range game processing. At subsequent step 11, influence-level data based on the instruction received at step 10 is stored in the influence-level data storage region 61 of the WRAM 14. Specifically, if the received instruction is to select the narrow-range game processing, "0" is stored as influence-level data. If the received instruction is to select the wide-range game processing, "1" is stored as influence-level data. By performing steps 10 and 11, the influence-level data is set.

Subsequently, by performing processes of steps 12 to 17, the link strengths of wireless communication between the master machine and each slave machine are detected. Specifically, at step 12, the value of counter N is set such that N=1. At subsequent step 13, the link strength with respect to the N'th slave machine is detected. More specifically, the link strength is detected by detecting the success rate (bit error rate) for sending and receiving data. Note that the link strength can be any kind of information as long as the information indicates the distance between the game machines; for example, a radio wave strength may be detected instead of a link strength. In another embodiment, error rates having been detected over the past few frames may be stored and the value of a link strength at the present moment may be determined based on the detected error rates. In the present embodiment, the link strength is detected as a value of between 0 and 1. The greater the value, the greater the link strength.

In the present embodiment, the value of the detected link strength is adjusted in accordance with the value of influence-level data stored in the WRAM 14. Specifically, in the case where the influence-level data is "0", the detected link strength is adjusted according to the following Equation (1):

$$y=1.5x-0.5 \qquad (1),$$

where y is a value after adjustment and x is a value before adjustment. As a result of adjusting the value using Equation (1), the value of the link strength after adjustment becomes smaller than that before adjustment and accordingly the link strength after adjustment indicates a shorter distance than the distance (between the game machines) indicated by the link strength before adjustment. Note that in the case where the influence-level data is "1", the link strength is not adjusted.

At step 14, the CPU core 11 determines whether or not the value of the link strength detected at step 13 is equal to or smaller than a predetermined value. Note that the predetermined value is determined in advance and has a value with which normal communication is considered to be impossible. The inner region shown with a dashed line in FIG. 4 is a region in which the link strength is greater than the predetermined value. If at step 14 it is determined that the value of the link strength is equal to or smaller than the predetermined value, the process of step 15 is performed. At step 15, the player is notified that communication cannot be established. Specifically, a message "master machine cannot communicate with slave machine" is displayed on the LCD 21. Thereafter, processing returns to step 13 and the processes of steps 13 and 14 are repeated until the master machine is able to establish communication with the N'th slave machine, i.e., until the link strength reaches a value greater than the predetermined value. That is, the game processing is suspended until the master machine is able to establish communication with the slave machine.

If at step 14 it is determined that the value of the link strength is greater than the predetermined value, the process of step 16 is performed. At step 16, the CPU core 11 determines whether the value of N is smaller than the number of slave machines. Step 16 is the process of determining whether the link strengths with respect to all N pieces of slave machines have been detected. If at step 16 it is determined that the value of N is smaller than the number of slave machines, the process of step 17 is performed. At step 17, N is incremented and then processing returns to step 13. The processes of steps 13 to 17 are repeated until the link strengths with respect to all slave machines have been detected. If at step 16 it is determined that the value of N is equal to or greater than the number of slave machines, processing proceeds to step 18.

At steps 18 and 19, spell attack processing is performed. The spell attack processing is processing for determining the type of spell and the power of spell used when the player character launches a spell attack. First, at step 18, a spell power value is calculated for each type of spell. Specifically, the spell power value is calculated using the following Equation (2):

$$\text{(Spell power value)}=\text{(First attribute parameter)}+\text{(Second attribute parameter)}+\text{(Third attribute parameter)} \qquad (2).$$

Here, the first attribute parameter is set with a reference value of each type of spell. Each of the second and third attribute parameters is set with a value obtained by adding up a reference value of each type of spell and a link strength. These reference values are stored in the aforementioned spell attribute table (see FIG. 12). In an example case where the spell attribute table shown in FIG. 12 is used, the spell power value of each type of spell is obtained as follows:

$$\text{(Spell power value of fire spell)}=-20+20 \times LC2+100 \times LC3;$$

$$\text{(Spell power value of water spell)}=120+(-80) \times LC2+(-60) \times LC3; \text{ and}$$

$$\text{(Spell power value of thunder spell)}=20+70 \times LC2+(-60) \times LC3,$$

where LC2 is the link strength between the master machine and the second slave machine and LC3 is the link strength between the master machine and the third slave machine.

In this manner, at step 18, the spell power value of each type of spell is calculated using Equation (2). In the present embodiment, the link strength between the first game machine and the second game machine is reflected to the value of the second attribute parameter and the link strength between the first game machine and the third game machine is reflected to the value of the third attribute parameter. Therefore, the link strength between the first game machine and the second game machine and the link strength between the first game machine and the third game machine are individually reflected to the game processing and different influences are given to the game processing. That is, the processing result is different between the case where the second player comes close to the first player and the case where the third player comes close to the first player. Accordingly, by using attribute parameters as in the present embodiment, the flexibility of the way the game proceeds can be increased, which in turn makes the game more complex and interesting.

At step 19, the CPU core 11 selects the type of spell which is cast upon instruction from the player to launch a spell attack. Specifically, the CPU core 11 selects, from among three types of spell, the type of spell having the greatest spell power value which is calculated at step 18. In the above-described case, the spell power value of each type of spell is obtained in the manner shown below. Note that the present example assumes a situation where the second player is present near the first player and the third player is present far from the first player; specifically, a situation where LC2=0.95 and LC3=0.1 (i.e., the situation shown in FIG. 6).

(Spell power value of fire spell)=−20+20×0.95+100× 0.1=9

(Spell power value of water spell)=120+(−80)×0.95+ (−60)×0.1=38

(Spell power value of thunder spell)=20+70×0.95+(− 60)×0.1=80.5

Thus, in the present example, the thunder spell is selected as the type of spell to be cast.

At step 20 shown in FIG. 15, the CPU core 11 receives slave communication data from each slave machine. The received slave communication data is stored in the send/receive data storage region 62 of the WRAM 14 of the master machine. In this manner, the master machine acquires the location data of player characters corresponding to the slave machines (i.e., the player characters to be operated by the players having the slave machines). At subsequent step 21, the CPU core 11 of the master machine determines the locations of the player characters other than its own player character. Here, the player characters other than the master machine's own player character indicate player characters to be operated by the players having game machines other than the master machine (i.e., by the players of the slave machines). At step 21, the locations of the player characters corresponding to the slave machines are determined based on the location data acquired at step 20. Then, at step 22, the locations of enemy characters are determined according to a predetermined movement algorithm. The predetermined movement algorithm is determined in advance in the game program. Subsequently, at step 23 the background of the game space is rendered, and at step 24 the enemy characters appearing in the game space are rendered.

After step 24, at step 25, the CPU core 11 receives a key input. Specifically, the CPU core 11 reads an operation signal from the control switch 22. Then, at step 26, the CPU core 11 determines whether the key input received at step 25 is made to the A button 22b. Here, the A button 22b is a control switch used to instruct the player character to launch a spell attack. That is, step 26 is the process of determining whether the player has instructed to launch a spell attack. If at step 26 it is determined that an input to the A button 22b has not been made, steps 27 to 29 are skipped. If at step 26 it is determined that an input to the A button 22b has been made, the result of the spell attack processing is reflected to a game image at steps 27 to 29. Specifically, first, at step 27, the spell-casting flag is set to "1". Then, at step 28, the amount of damage to the enemy character is calculated. In the present embodiment, the amount of damage to the enemy character is determined based on the spell power value of the type of spell which is selected at step 19. For example, the spell power value may be directly set as the amount of damage to the enemy character, or in the case where the enemy character is provided with a characteristic (e.g., the enemy character is vulnerable to a fire spell), the amount of damage to the enemy character may be calculated taking into account the characteristic. Subsequently, at step 29, an effect image of the type of spell selected at step 19 is rendered. After step 29, step 30 is performed.

At step 30, the CPU core 11 determines whether the key input received at step 25 is made to the cross key 22a. Here, the cross key 22a is a control switch used to instruct the movement direction of the player character in the game space. That is, step 30 is the process of determining whether the player has instructed the player character to move. If at step 30 it is determined that an input to the cross key 22a has not been made, the process of step 31 is skipped. If at step 30 it is determined that an input to the cross key 22a has been made, the CPU core 11 of the master machine determines the location of its own player character in the game space. After step 31, step 40 shown in FIG. 16 is performed.

At step 40 shown in FIG. 16, master communication data is generated (see FIG. 10B). Then, at step 41, the master communication data is sent to each slave machine. By performing steps 40 and 41, each slave machine acquires the result (spell type data and spell power value data) of the spell attack processing and the location data of each game character. Subsequently, at step 42, each player character is rendered. By performing step 42 and the aforementioned steps 23 and 24, a game image which represents the game space is rendered. At step 43, a spell display icon is rendered (see FIG. 3). The spell display icon rendered at step 43 indicates the type of spell having been selected at step 19. Note that the spell display icon is rendered and displayed regardless of whether or not the player has instructed to launch a spell attack. Hence, even when the spell attack is not being launched, the spell display icon is displayed on the screen. That is, by seeing the spell display icon, the player can easily know the type of spell currently able to be used.

At step 44, a game image which includes the images rendered at steps 23, 24, 29, 42, and 43 is displayed on the screen of the LCD 21. Then, at step 45, the spell-casting flag is set to "0". At step 46, the CPU core 11 determines whether the game is over. For example, when all player characters' energy levels reach zero or when all enemy characters are defeated, the CPU core 11 determines that the game is over. If at step 46 it is determined that the game is over, the CPU core 11 completes the game processing. If at step 46 it is determined that the game is not over, processing returns to step 12. Then, the processes of steps 12 to 45 are repeated until it is determined that the game is over. By repeating the processes of steps 14 to 46 on a frame-by-frame basis, a game image is updated and displayed. This is all for the description of the flow of the game processing for the master machine.

FIGS. 17 and 18 are flowcharts showing the flow of game processing for a slave machine. First, at step 50, initialization is performed. Specifically, a CPU core 11 sets the initial location of each game character at a predetermined location and displays a game space in which the game characters are arranged at the initial locations, as a game image for the start of the game.

At step 51, the CPU core 11 receives a key input. The process of step 51 is the same as that of the aforementioned step 31. Subsequently, at step 52, the CPU core 11 determines whether the key input received at step 51 is made to the cross key 22a. If at step 52 it is determined that an input to the cross key 22a has not been made, the process of step 53 is skipped. If at step 52 it is determined that an input to the cross key 22a has been made, the process of step 53 is performed. The process of step 53 is the same as that of step 31. After step 53, the process of step 54 is performed.

At step 54, slave communication data is generated (see FIG. 10A). Then, at step 55, the slave communication data is sent to the master machine. By performing steps 54 and 55, the master machine acquires the location data of the player characters corresponding to the slave machines. The master machine performs processing (steps 21, 22, and 31) for moving each game character using the acquired location data, and then determines the location of each game character for the next frame. In addition, the master machine performs spell attack processing (steps 18 and 19) to determine whether a spell has been cast and to select the type of spell to be cast. Then, the result of the game processing performed by the master machine is sent to each slave machine as master communication data (step 41). Thus, at step 56, the CPU core 11 of the slave machine receives the master communication data. By this, the slave machine acquires the result (spell type data and spell power value data) of the spell attack processing and the location data of each game character.

At steps 57, 60, and 61, a game image which represents the game space is rendered. Specifically, at step 57 a background is rendered, and subsequently at step 60 shown in FIG. 18 enemy characters are rendered. Further, at step 61, each player character is rendered.

At step 62, the CPU core 11 determines whether the spell-casting flag included in the master communication data which is received at step 56 is set to "1". If at step 62 it is determined that the spell-casting flag is set to "1", an effect image of a spell is rendered at step 63. Note that the type of spell to be represented by the effect image is determined based on the type of spell indicated by the spell type data which is included in the master communication data. That is, the same effect image is rendered and displayed on the master and slave machines. If at step 62 it is determined that the spell-casting flag is set to "0", step 63 is skipped and step 64 is performed.

At step 64, a spell display icon is rendered. The type of spell indicated by the spell display icon is the same as that indicated by the spell type data which is included in the master communication data. Then, at step 65, a game image which includes the images rendered at steps 57, 60, 61, and 63 is displayed on the screen of the LCD 21. Subsequent to step 65, at step 66, the CPU core 11 determines whether the game is over. The process of step 66 is the same as that of step 46. If at step 66 it is determined that the game is over, the CPU core 11 completes the game processing. If at step 66 it is determined that the game is not over, processing returns to step 51. Then, the processes of steps 51 to 65 are repeated until it is determined that the game is over. By repeating the processes of steps 51 to 65 on a frame-by-frame basis, a game image is updated and displayed. This is all for the description of the flow of the game processing for the slave machine.

As described above, in the illustrative embodiments, by using the link strength, the positional relationship between players is caused to reflect to the game processing, thereby providing players with an unconventional, new way of playing the game in which the actual positional relationship between the players influences the way the game proceeds. In particular, by assigning an attribute parameter to each game machine, each game machine can be provided with a characteristic. This makes the conditions of the positional relationship between the players more complex, which in turns makes the way the game proceeds more complex, resulting in the providing of a very amusing game.

Although in the above-described embodiment, the type of spell to be cast is automatically selected based on the link strength (step 19), in another embodiment the type of spell may be selected by the player. Specifically, at step 19, the type of spell to be cast may be selected based on a selection made by the player. In this case, although the player can freely select the type of spell, the power of spell varies depending on the link strength. That is, the player needs to select an appropriate type of spell depending on the positional relationship between the players. In other words, the game system provides a new way of playing the game in which the player performs an appropriate operation depending on the positional relationship between the players.

The above-described embodiment describes an example case where the player character attacks enemy characters using a spell; however, the game processing which is influenced by the link strength is not limited to the above case. For example, the type or power of attack the player character carries out against other player characters may change depending on the link strength. Alternatively, the link strength may be reflected to the process of restoring the energy level of the player character. Specifically, the degree of restoring the energy level of the player character may change depending on the link strength.

Although in the above-described embodiment, the first game machine always acts as the master machine, in another embodiment, for example, other game machines may take it in turn to act as the master machine on the basis of a predetermined number of frames. In this case, the player character which is able to use a spell is taken over by another based on the game machine which acts as the master machine. The role of the master machine may be taken over by another on the basis of a predetermined number of frames or may be taken over by another when conditions relating to the way the game proceeds are met (e.g., when a specific item is obtained). In addition, although in the above-described embodiment, only the first player character is able to use a spell, in another embodiment, other player characters may also be able to use a spell in addition to the first player character.

While the invention has been described in detail, the foregoing description is in all aspects illustrative and not restrictive. It is understood that numerous other modifications and variations can be devised without departing from the scope of the invention.

What is claimed is:

1. A game system comprising a first portable game machine and at least one second portable game machine configured to establish short-range wireless communication with the first game machine, wherein a game image representing a part or all of an identical game space is displayed on each game machine, the first game machine comprises:

a link strength detector which detects a link strength of a wireless communication link between the first game machine and the second game machine;

game processing execution programmed logic circuitry which executes predetermined game processing such that a processing result changes depending on the link strength detected by the link strength detector, wherein the predetermined game processing uses at least a plurality of attribute parameters which are associated with each of the first and second game machine and wherein the game processing execution programmed logic circuitry executes the predetermined game processing by augmenting a value of each attribute parameter with respect to at least the first game machine depending at least in part on both link strength between the first game machine and the second game machine and a value associated with the same attribute parameter associated with the second game machine;

first game image updating programmed logic circuitry which updates the game image based on a result of the predetermined game processing; and a processing result transmitter which transmits game processing information to the second game machine, the game processing information indicating the result of the predetermined game processing, and the second game machine comprises:
second game image updating programmed logic circuitry which updates the game image based on the game processing information transmitted from the first game machine.

2. The game system according to claim 1, wherein
game characters appear in the game space, the game characters including a plurality of player characters to be operated by players of the game machines, respectively,
the predetermined game processing is processing for changing a value of an energy level parameter which indicates an energy level of each game character, and
the game processing execution programmed logic circuitry changes a degree of change in the value of the energy level parameter depending on the link strength.

3. The game system according to claim 2, wherein
an enemy character which is different from the player characters further appears in the game space, and
the predetermined game processing is processing for changing an energy level parameter of the enemy character in response to an attack by the player characters.

4. The game system according to claim 1, wherein
the link strength detector expresses the link strength in a numeric value,
the first game machine further comprises influence-level information setting programmed logic circuitry which sets influence-level information in response to an instruction from a player of the first game machine, the influence-level information indicating an influence level of the link strength to be exerted on the predetermined game processing, and
the game processing execution programmed logic circuitry changes the influence level of the link strength to be exerted on the predetermined game processing depending on the influence-level information.

5. The game system according to claim 1, wherein
the first game machine further comprises:
determination programmed logic circuitry which determines whether or not a value of the link strength detected by the link strength detector is equal to or smaller than a predetermined value; and
notification programmed logic circuitry which notifies a player that a game has been suspended, if the execution of the predetermined game processing has been suspended, and
if the determination programmed logic circuitry determines that the value of the link strength is equal to or smaller than the predetermined value, the game processing execution programmed logic circuitry stops the execution of the predetermined game processing.

6. A game system comprising at least two portable game machines configured to establish short-range wireless communication therebetween, wherein
the game machines each comprise:
a link strength detector which detects a link strength of a wireless communication link with respect to the other game machines;
parameter setting programmed logic circuitry which sets at least one parameter which is associated with each respective game machine;
a parameter sending controller which sends the parameter to the other one or more game machines;
game processing execution programmed logic circuitry which executes predetermined game processing such that a processing result changes depending on the link strength detected by the link strength detector, wherein the predetermined game processing uses one of the least one parameters which is associated with each of the game machines and wherein the game processing execution programmed logic circuitry executes the predetermined game processing by augmenting a value of the at least one parameter with respect to at least a first game machine depending at least in part on both link strengths between the first game machine and at least a second game machine and a value associated with the at least one same parameter provided by the second game machine; and
game image updating programmed logic circuitry for updating a game image based on a result of the predetermined game processing.

7. The game system according to claim 6, wherein
a non-player character, which is different from player characters to be operated by players of the game machines, appears in a game to be executed by the game processing execution programmed logic circuitry, and
the game processing execution programmed logic circuitry performs a predetermined calculation based at least in part on the link strength detected by the link strength detector and the parameter set to the other game machine with respect to which the link strength has been detected, and changes a result of an attack against the non-player character based on a result of the calculation.

8. A game system comprising a first portable game machine and a second portable game machine configured to establish short-range wireless communication with the first game machine, wherein
a game image representing a part or all of an identical game space in which a non-player character appears is displayed on each game machine, the non-player character being a game character which is different from player characters to be operated by players of the game machines,
the second game machine comprises:
at least one parameter storage location which stores a parameter; and
a parameter sending controller which sends the parameter to the first game machine,
the first game machine comprises:
a parameter receiving controller which receives the parameter to be sent from the parameter sending controller of the second game machine;
a link strength detector which detects a link strength of a wireless communication link between the first game machine and the second game machine; and
an attack processor for performing a predetermined calculation using the link strength with respect to the second game machine detected by the link strength detector and the same parameter of the second game machine received by the parameter receiving controller, and changing a result of an attack against the non-player character based on a result of the calculation.

9. The game system according to claim 8, wherein
the link strength detector expresses the link strength in a numeric value,
the first game machine further comprises influence-level information setting programmed logic circuitry which sets influence-level information in response to an instruction from a player of the first game machine, the influence-level information indicating an influence level of the link strength to be exerted on the predetermined game processing, and
the game processing execution programmed logic circuitry changes the influence level of the link strength to be exerted on the predetermined game processing depending on the influence-level information.

10. The game system according to claim 8, wherein the first game machine further comprises:

determination programmed logic circuitry which determines whether or not a value of the link strength detected by the link strength detector is equal to or smaller than a predetermined value; and notification programmed logic circuitry which notifies a player that a game has been suspended, if the execution of the predetermined game processing has been suspended, and if the determination programmed logic circuitry determines that the value of the link strength is equal to or smaller than the predetermined value, the game processing execution programmed logic circuitry stops the execution of the predetermined game processing.

11. A first portable game machine configured to establish short-range wireless communication with at least one second game machine, wherein a game image representing a part or all of an identical game space is displayed on each game machine, and the portable game machine comprises:

a link strength detector which detects a link strength of a wireless communication link between the first game machine and the second game machine;

game processing execution programmed logic circuitry which executes predetermined game processing such that a processing result changes depending on the link strength detected by the link strength detector, wherein the predetermined game processing uses one or more attribute parameters which are associated with each of the first game machine and the second game machine, and wherein the game processing execution programmed logic circuitry executes the predetermined game processing by changing a value of each attribute parameter associated with the first game machine depending at least in part on both link strength between the first game machine and the second game machine and the same one or more attribute parameters associated with the second game machine;

first game image updating programmed logic circuitry which updates the game image based on a result of the predetermined game processing; and a processing result transmitter which transmits game processing information to the other game machine, the game processing information indicating the result of the predetermined game processing.

12. The game machine according to claim 11, wherein the first game machine establishes short-range wireless communication with a plurality of other game machines, the predetermined game processing uses at least a plurality of attribute parameters which are associated with the plurality of other game machines, and the game processing execution programmed logic circuitry executes the predetermined game processing by changing a value of each attribute parameter depending on link strengths between the first game machine and the plurality of game machines associated with the attribute parameters.

13. A computer readable storage medium tangibly embodying instructions corresponding to a game program that, when executed, cause a computer of a first portable game machine configured to establish short-range wireless communication with at least one second game machine, wherein a game image representing a part or all of an identical game space is displayed on each game machine, to perform steps comprising:

detecting a link strength of a wireless communication link between the first game machine and the at least one second game machine;

executing predetermined game processing such that a processing result changes depending on the link strength detected by the detecting, wherein the predetermined game processing uses one or more attribute parameters which are associated with each of the first game machine and the second game machine, and wherein, by the executing, the predetermined game processing is executed by changing a value of each attribute parameter associated with the first game machine depending at least in part on both link strength between the first game machine and the second game machine and the same one or more attribute parameters associated with the second game machine;

updating the game image based on a result of the predetermined game processing; and sending game processing information to the second game machine, the game processing information indicating the result of the predetermined game processing.

14. The computer readable storage medium according to claim 13, wherein the first game machine establishes short-range wireless communication with a plurality of other game machines, the predetermined game processing uses at least a plurality of attribute parameters which are associated with the plurality of other game machines, and at the game processing execution step, the predetermined game processing is executed by changing a value of each attribute parameter depending on link strengths between the first game machine and the plurality of game machines associated with the attribute parameters.

15. At least two portable game machines configured to establish short-range wireless communication therebetween, wherein a game image representing a part or all of an identical game space is displayed on each game machine, and the game machines each comprise:

a link strength detector which detects a link strength of a wireless communication link with respect to the other one or more game machines;

parameter setting programmed logic circuitry which sets at least one parameter which is associated with each respective game machine;

a parameter sending controller which sends the parameter to other game machines;

game processing execution programmed logic circuitry which executes predetermined game processing such that a processing result changes depending on the link strength detected by the link strength detector, wherein the predetermined game processing uses one of the at least one parameters which is associated with each of the game machines and wherein the game processing execution programmed logic circuitry executes the predetermined game processing by augmenting a value of the at least one parameter with respect to at least a first game machine depending at least in part on both link strengths between the first game machine and at least a second game machine and a value associated with the at least one same parameter provided by the second game machine; and game image updating programmed logic circuitry for updating a game image based on a result of the predetermined game processing.

16. A computer readable storage medium storing a game program for causing computers of at least two portable game machines configured to establish short-range wireless communication therebetween, wherein a game image representing a part or all of an identical game space is displayed on each game machine, to perform:
    detecting a link strength of a wireless communication link with respect to the other one or more game machines;
    setting at least one parameter which is associated with each respective game machine;
    sending the parameter to other one or more game machines;
    executing predetermined game processing such that a processing result changes depending on the link strength detected by the detecting, wherein the predetermined game processing uses one of the at least one parameters which is associated with each of the game machines and wherein the executing augments a value of the at least one parameter with respect to at least a first game machine depending at least in part on both link strengths between the first game machine and at least a second game machine and a value associated with the at least one same parameter provided by the second game machine; and
    updating a game image based on a result of the predetermined game processing.

17. A first portable game machine and a second portable game machine configured to establish short-range wireless communication with the first game machine, wherein
    a game image representing a part or all of an identical game space in which a non-player character appears is displayed on each game machine, the non-player character being a game character which is different from player characters to be operated by players of the game machines,
    the second game machine comprises:
    at least one parameter storage location which stores a parameter; and
    a parameter sending controller which sends the parameter to the first game machine,
    the first game machine comprises:
    a parameter receiving controller which receives the parameter to be sent from the parameter sending controller of the second game machine;
    a link strength detector which detects a link strength of a wireless communication link between the first game machine and the second game machine; and
    an attack processor for performing a predetermined calculation using the link strength with respect to the second game machine detected by the link strength detector and the same parameter of the second game machine received by the parameter receiving controller, and changing a result of an attack against the non-player character based on a result of the calculation.

18. A computer readable storage medium storing a game program for causing a second portable game machine executing the program and configured to establish short-range wireless communication with a first game machine, wherein a game image representing a part or all of an identical game space in which a non-player character appears is displayed on each game machine, the non-player character being a game character which is different from player characters to be operated by players of the game machines, to perform:
    storing a parameter; and
    sending the parameter to the first game machine,
    wherein the program causes the first game machine executing the program to perform:
    receiving the parameter to be sent from the parameter sending controller of the second game machine;
    detecting a link strength of a wireless communication link between the first game machine and the second game machine; and
    performing a predetermined calculation using the link strength with respect to the second game machine detected by the detecting and the same parameter of the second game machine received by the receiving, and changing a result of an attack against the non-player character based on a result of the calculation.

19. A game system comprising a first portable game machine and at least one second portable game machine configured to establish short-range wireless communication with the first game machine, wherein
    a game image representing a part or all of an identical game space is displayed on each game machine,
    the first game machine comprises:
    a link strength detector which detects a link strength of a wireless communication link between the first game machine and the second game machine, wherein the link strength detector expresses the link strength in a numeric value;
    game processing execution programmed logic circuitry which executes predetermined game processing such that a processing result changes depending on the link strength detected by the link strength detector;
    first game image updating programmed logic circuitry which updates the game image based on a result of the predetermined game processing;
    a processing result transmitter which transmits game processing information to the second game machine, the game processing information indicating the result of the predetermined game processing; and
    influence-level information setting programmed logic circuitry which sets influence-level information in response to an instruction from a player of the first game machine, the influence-level information indicating an influence level of the link strength to be exerted on the predetermined game processing, wherein
    the game processing execution programmed logic circuitry changes the influence level of the link strength to be exerted on the predetermined game processing depending on the influence-level information, and
    the influence-level information being based on the same attribute parameter associated with the first and the second game machine
    the second game machine comprises:
    second game image updating programmed logic circuitry which updates the game image based on the game processing information transmitted from the first game machine.

20. The game system according to claim 19, wherein
    there are a plurality of second game machines,
    the predetermined game processing uses at least a plurality of attribute parameters which are associated with the second game machines, and
    the game processing execution programmed logic circuitry executes the predetermined game processing by changing a value of each attribute parameter depending on link strengths between the first game machine and the second game machines associated with the attribute parameters.

21. The game system according to claim 19, wherein
game characters appear in the game space, the game characters including a plurality of player characters to be operated by players of the game machines, respectively,
the predetermined game processing is processing for changing a value of an energy level parameter which indicates an energy level of each game character, and
the game processing execution programmed logic circuitry changes a degree of change in the value of the energy level parameter depending on the link strength.

22. The game system according to claim 19, wherein
an enemy character which is different from the player characters further appears in the game space, and
the predetermined game processing is processing for changing an energy level parameter of the enemy character in response to an attack by the player characters.

23. The game system according to claim 19, wherein
the first game machine further comprises:
determination programmed logic circuitry which determines whether or not a value of the link strength detected by the link strength detector is equal to or smaller than a predetermined value; and
notification programmed logic circuitry which notifies a player that a game has been suspended, if the execution of the predetermined game processing has been suspended, and
if the determination programmed logic circuitry determines that the value of the link strength is equal to or smaller than the predetermined value, the game processing execution programmed logic circuitry stops the execution of the predetermined game processing.

24. A first portable game machine and a second portable game machine configured to establish short-range wireless communication with the first game machine, wherein
a game image representing a part or all of an identical game space is displayed on each game machine,
the first game machine comprises:
a link strength detector which detects a link strength of a wireless communication link between the first game machine and the second game machine, wherein the link strength detector expresses the link strength in a numeric value;
game processing execution programmed logic circuitry which executes predetermined game processing such that a processing result changes depending on the link strength detected by the link strength detector;
first game image updating programmed logic circuitry which updates the game image based on a result of the predetermined game processing;
a processing result transmitter which transmits game processing information to the second game machine, the game processing information indicating the result of the predetermined game processing; and
influence-level information setting programmed logic circuitry which sets influence-level information in response to an instruction from a player of the first game machine, the influence-level information indicating an influence level of the link strength to be exerted on the predetermined game processing, wherein
the game processing execution programmed logic circuitry changes the influence level of the link strength to be exerted on the predetermined game processing depending on the influence-level information, and
the influence-level information being based on the same attribute parameter associated with the first and the second game machine
the second game machine comprises:
second game image updating programmed logic circuitry which updates the game image based on the game processing information transmitted from the first game machine.

25. A computer readable storage medium storing a game program for causing a computer of a first portable game machine configured to establish short-range wireless communication with at least one second game machine, wherein a game image representing a part or all of an identical game space is displayed on each game machine, to perform:
detecting a link strength of a wireless communication link between the first game machine and the second game machine, wherein the detecting expresses the link strength in a numeric value;
executing predetermined game processing such that a processing result changes depending on the link strength detected by the detecting;
updating the game image based on a result of the predetermined game processing;
transmitting game processing information to the second game machine, the game processing information indicating the result of the predetermined game processing; and
setting influence-level information in response to an instruction from a player of the first game machine, the influence-level information indicating an influence level of the link strength to be exerted on the predetermined game processing, wherein
the executing changes the influence level of the link strength to be exerted on the predetermined game processing depending on the influence-level information, and
the influence-level information being based on the same attribute parameter associated with the first and the second game machine
the program being executed by the second game machine causes the second game machine to perform:
updating the game image based on the game processing information transmitted from the first game machine.

* * * * *